US011212731B2

United States Patent
Huang

(10) Patent No.: US 11,212,731 B2
(45) Date of Patent: Dec. 28, 2021

(54) MOBILE NETWORK INTERACTION PROXY

(71) Applicant: ZTE CORPORATION, Guangdong (CN)

(72) Inventor: Qiang Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/830,901

(22) Filed: Mar. 26, 2020

(65) Prior Publication Data

US 2020/0296653 A1  Sep. 17, 2020

Related U.S. Application Data

(63) Continuation of application No. PCT/CN2017/104073, filed on Sep. 28, 2017.

(51) Int. Cl.
*H04W 40/24* (2009.01)
*H04W 88/18* (2009.01)
*H04W 92/02* (2009.01)

(52) U.S. Cl.
CPC .......... *H04W 40/24* (2013.01); *H04W 88/182* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 10,671,441 B2 * | 6/2020 | Ohta | ..................... | H04W 8/082 |
| 2017/0048876 A1 | 2/2017 | Mahindra | | |
| 2018/0359617 A1 | 12/2018 | Duan | | |
| 2019/0129745 A1 | 5/2019 | Wang | | |
| 2020/0099742 A1 * | 3/2020 | Puente Pestana | ... | H04L 67/1021 |
| 2020/0229037 A1 * | 7/2020 | Agarwal | ........... | H04W 28/0289 |

FOREIGN PATENT DOCUMENTS

| | | | |
|---|---|---|---|
| CN | 105975330 A | 9/2016 | |
| CN | 106817686 A1 | 6/2017 | |
| WO | 2016134772 A1 | 9/2016 | |
| WO | WO-2016134772 A1 * | 9/2016 | ........ H04M 15/8214 |
| WO | 2017070895 A1 | 5/2017 | |

(Continued)

OTHER PUBLICATIONS

Sabella et al. "Mobile Edge Computing Architecture" The Role of MEC in the Internet of Things, IEEE Consumer Electronics Magazine, Oct. 2016 (Year: 2016).*

(Continued)

*Primary Examiner* — Jamaal Henson
(74) *Attorney, Agent, or Firm* — Duane Morris LLP

(57) ABSTRACT

A system and method for integrating a mobile network with an edge computing system is disclosed. In one embodiment, a method performed by a communication node includes: identifying edge computing parameters for an edge computing system, wherein the edge computing parameters are used for routing user plane data to the edge computing system using a control plane of a mobile network; determining that communications are to be performed at the edge computing system in accordance with the edge computing parameters; and sending the edge computing parameters to the control plane.

17 Claims, 20 Drawing Sheets

(56) References Cited

FOREIGN PATENT DOCUMENTS

WO      2017151025 A1    9/2017
WO      2018215046 A1    11/2018

OTHER PUBLICATIONS

"Mobile Edge Computing (MEC) Framework and Reference Architecture", ETSI GS MEC 003 vl.1.1, Mar. 31, 2016 (Mar. 31, 2016), 18 pages.

"Next Generation Protocols (NGP); Scenario Definitions" ETSI GS NGP 001, V1.2.1, F-06921, 3GPP, vol. TSG CT, May 28, 2017, 126 pages.

* cited by examiner

MOBILE NETWORK INTERACTION PROXY

TECHNICAL FIELD

This disclosure relates generally to wireless communications and, more particularly, to systems and methods for integrating a mobile network with an edge computing system.

BACKGROUND

Mobile telecommunications have become increasingly pervasive in everyday life, society, politics, and the global economy. Furthermore, the desire for various information services continues to grow at an explosive rate. For example, as mobile networks (e.g. radio access technologies such as 4G mobile networks or 5G mobile networks) continue to develop, they will not only provide for communications between people, but also between equipment as part of the Internet of Things (IoT). For example, with virtual reality applications, high definition communications (e.g., high definition video) may require high data rate services with low latency. This required data rate may reach 10-100 times certain currently available data rates. As another example, automobile networks (e.g., telematics systems or intelligent transport system) may require low end-to-end latency of, for example, five times less than certain current values. Furthermore, the IoT may be projected to support thousands of times more services than that available in the past, while extending battery life to ten times longer than previously available.

With this increased demand for large bandwidth with reduced latency, it may be desirable to locate mobile applications hosted by the mobile network closer to a user equipment (UE) that uses such mobile applications. This location of mobile applications (e.g., software programs or services) closer to a UE may provide desirable savings of bandwidth and latency. For network operators, edge computing (e.g., mobile edge computing) may provide a desirable computing platform for business computing applications and revenue generation by improving exposure of mobile networks (e.g., radio access technologies (RATs), such as the 4G long term evolution (LTE) mobile network or 5G new radio (NR) mobile networks), for mobile application developers and providers. Furthermore, edge computing may facilitate, for example, improved (e.g., faster) access to user position information and mobile application dependent quality of service (QoS). In the developing 5G era, edge computing may bring an operator competitive advantages by combining transmission pipe operations and computing operations (e.g., by moving computations closer to a data source).

FIG. 1A illustrates a network architecture for an edge computing system 100 in accordance with the European Telecommunications Standards Institute for Multi-access Edge Computing (ETSI-MEC). The ETSI-MEC edge computing system 100 may be a reference architecture for mobile edge computing that is currently prepared for deployment in a 4G network architecture but that is being developed for a 5G network architecture.

The ETSI-MEC edge computing system 100 may include a variety of components, such as a mobile edge orchestrator 102. The mobile edge orchestrator 102 may be responsible for selecting the mobile edge host 104, uploading a particular mobile application 106 and triggering the launch and termination of mobile application instances. The operations support system 108 may be responsible for access control for UEs 110 and third party users, where access control outcomes are input to the mobile edge orchestrator 102. The operations support system 108 may also be responsible for the management and maintenance of the ETSI-MEC edge computing system 100. The user application lifecycle management proxy (User App LCM proxy) 112 allows the UE 110 to add a mobile application instance, terminate a mobile application instance and inform the UE 110 of the status of a mobile application instance. The customer facing service portal (CFS portal) 114 provides the third party with the possibility of subscribing for a given set of mobile edge applications. The mobile edge platform manager 116 manages a mobile application's lifecycle, mobile application rules and requirements, and reception of the virtualization infrastructure manager's 118 error report and metrics. The virtualization infrastructure manager 118 distributes, manages and releases virtualized resources. The virtualization infrastructure manager 118 also collects and reports error messages on virtualization resource performance. The mobile edge host 104 includes the mobile edge platform 122 and the virtualization infrastructure 124, where the mobile edge applications run on the virtualization infrastructure. The mobile edge platform 122 collects information necessary for the operation of mobile edge computing and provides mobile edge services. The mobile edge applications 106 are the instantiation of the mobile applications (e.g., UE app 110) as hosted on the virtualization infrastructure 124 and mobile edge host 104. The user equipment mobile application (UE app) 110 interacts with the ETSI-MEC edge computing system 100 via the application lifecycle management proxy 112.

FIG. 1B illustrates a 5G service based architecture 150. This 5G service based architecture 150 may be defined by the 3GPP Technical Specification Group on Service and System Aspects of System Architecture (3GPP SA2). As part of the 5G service based architecture 150, the user equipment (UE) 152 may be connected with the radio access network (RAN) 154. The RAN 154 may be connected to the user plane function (UPF) 156. The UPF 156 may be connected with the session management function (SMF) 158. The SMF 158 may be responsible for access and management, such as selection and reselection of the UPF 156. The RAN 154 and the UE 152 may be connected with the access management function (AMF) 160. The AMF 160 may be responsible for managing mobile access and mobility. The AMF 160 and SMF 158 may be connected with the authentication service function (AUSF) 162, which is an entity for user authentication service. The AMF 160 and SMF 158 may also be connected with the network slice selection function (NSSF) 164, which is responsible for slice selection. The AMF 160 and SMF 158 may also be connected with the network exposure function (NEF) 166, which is responsible for the exposure of network function. The AMF 160 and SMF 158 may also be connected with the network resource repository (NRF) 168, which is responsible for network function discovery. The AMF 160 and SMF 158 may also be connected with the policy control function (PCF) 170, which is responsible for policy rules of the control plane. The AMF 160 and SMF 158 may also be connected with the user data management function (UDM) 172, which is responsible for user identification (ID) information management. The AMF 160 and SMF 158 may also be connected with the application function (AF) 174, which controls and deploys applications. The AF may be in a trusted domain or un-trusted domain.

Traditional 5G networks and ETSI-MEC edge computing systems may operate independently, without exchanging services with each other. Therefore, traditional 5G networks and ETSI-MEC edge computing systems are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node includes: identifying edge computing parameters for an edge computing system, wherein the edge computing parameters are used for routing user plane data to the edge computing system using a control plane of a mobile network; determining that communications are to be performed at the edge computing system in accordance with the edge computing parameters; and sending the edge computing parameters to the control plane.

In a further embodiment, a method performed by a communication node includes: receiving edge computing parameters from a control plane of a mobile network, wherein the edge computing parameters are used for routing user plane data to an edge computing system; sending the edge computing parameters to the edge computing system; and receiving an indication that communications are to be performed at the edge computing system in accordance with the edge computing parameters.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities, such as a BS, UE, PCF, NEF, etc. (either in physical or virtual form), which are similar to those mentioned above with respect to conventional communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Figure 2:
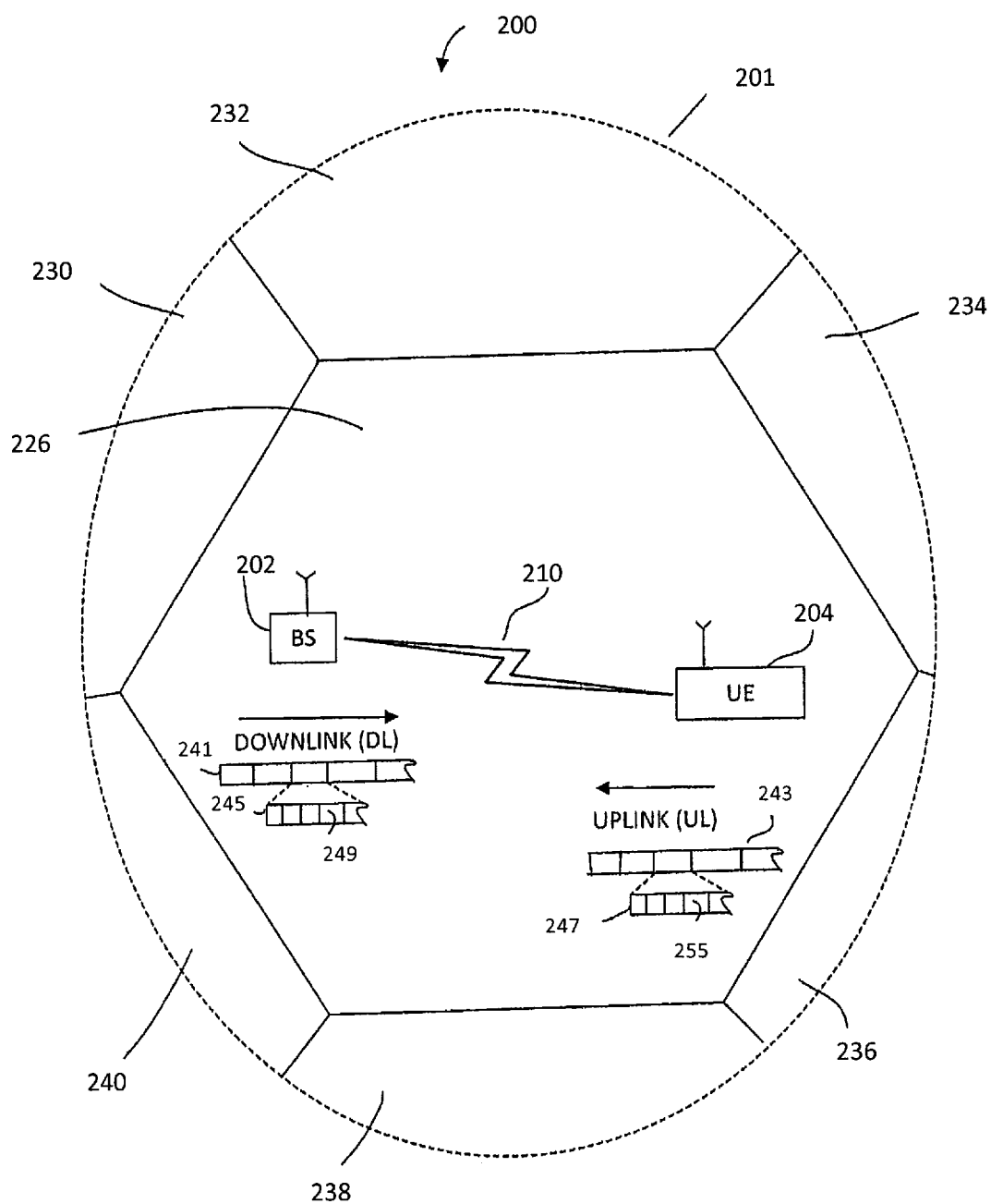
FIG. 2 illustrates an exemplary wireless communication network in which techniques disclosed herein may be implemented, in accordance with an embodiment.

FIG. 2 illustrates an exemplary wireless communication network 200 in which techniques disclosed herein may be implemented, in accordance with an embodiment of the present disclosure. The exemplary communication network 200 may overlay a geographic area 201 and include a base station (BS) 202 and a user equipment (UE) device 204 that can communicate with each other via a communication link 210 (e.g., a wireless communication channel), and a cluster of notional cells 226, 230, 232, 234, 236, 238 and 240. In FIG. 2, the BS 202 and UE 204 are contained within the geographic boundary of cell 226. Each of the other cells 230, 232, 234, 236, 238 and 240 may include at least one base station (BS) operating at its allocated bandwidth to provide adequate radio coverage to its intended users. For example, the BS 202 may operate at an allocated channel transmission bandwidth to provide adequate coverage to the UE 204. The BS 202 and the UE 204 may communicate via a downlink radio frame 241, and an uplink radio frame 243 respectively. Each radio frame 245/247 may be further divided into sub-frames 249/251 which may include data symbols 253/255.

In the present disclosure, the base station (BS) 202 and user equipment (UE) 204 are described herein as non-limiting examples of "communication nodes," generally, which can practice the methods disclosed herein. Such communication nodes may be capable of wireless and/or wired communications, in accordance with various embodiments of the invention. Each of these communication nodes may be a transmitter in one situation and a receiver in another situation. For example, a BS 202 may transmit to a UE 204, such as during a downlink (DL), discussed further below. Therefore, the BS 202 may be a transmitter and the UE 204 may be a receiver. However, in another situation (such as during an uplink (UL), described further below) the UE 204 may be a transmitter and the BS 202 may be a receiver. Accordingly, both the BS 202 and the UE 204 may be a receiver or a transmitter for advanced random access preamble transmissions, as will be discussed further below.

As introduced above, an edge computing system may move cloud computing closer to the proximity of UEs. Edge computing systems may address problems of long latency (e.g., communicating with remote devices and servers in the cloud). Advantageously, edge computing may offer significantly lower latencies and jitter when compared to the traditional cloud computing. Moreover, while traditional cloud computing may have a centralized approach with farms of computers usually placed at one or few locations, edge computing may be deployed in a more distributed manner. Accordingly, the BS 202 and the UE 204 may implement aspects of an edge computing system by performing processing of data for the UE 204 closer to the UE 204 (e.g., at the UE 204 and/or at the BS 202 and/or at another BS 202 within the cell 226) as opposed to at a remote farm of computers (e.g., server farm).

Figure 1A:
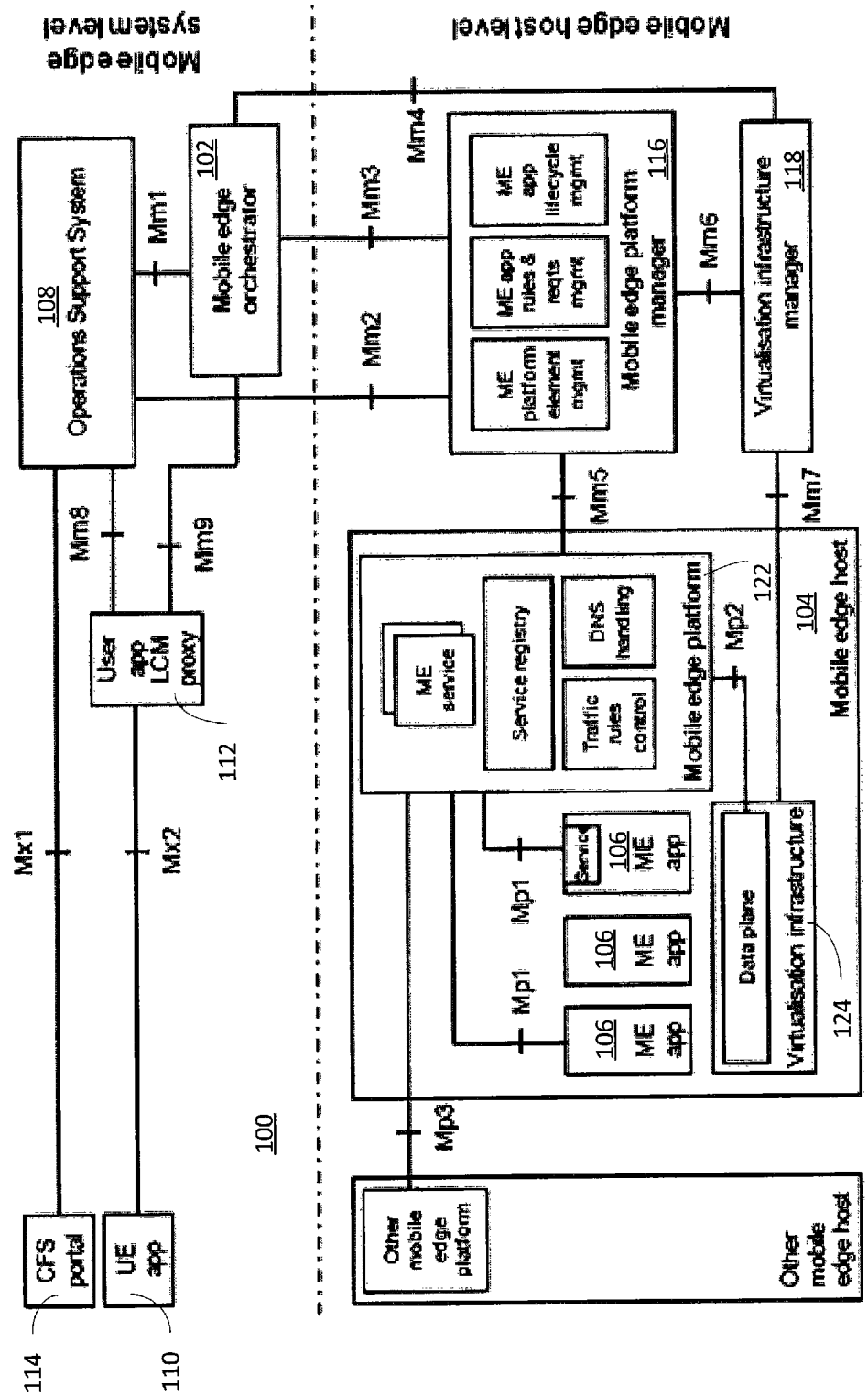
FIG. 1A illustrates a network architecture for an edge computing system in accordance with the European Telecommunications Standards Institute for Multi-access edge Computing (ETSI-MEC).
Figure 1B:
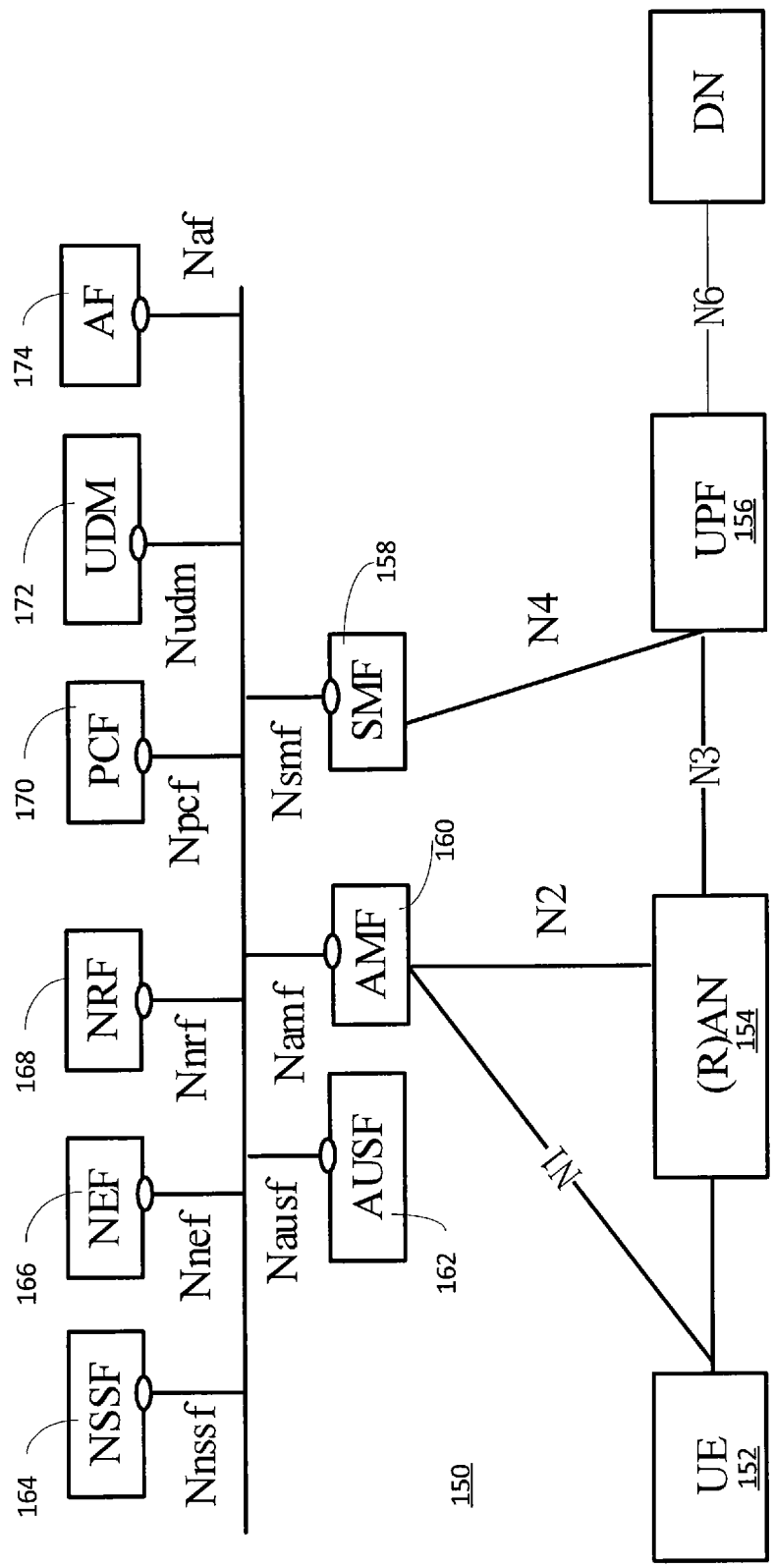
FIG. 1B illustrates a 5G service based architecture. This 5G service based architecture may be defined by the 3GPP Technical Specification Group on Service and System Aspects of System Architecture (3GPP SA2).
Figure 3:
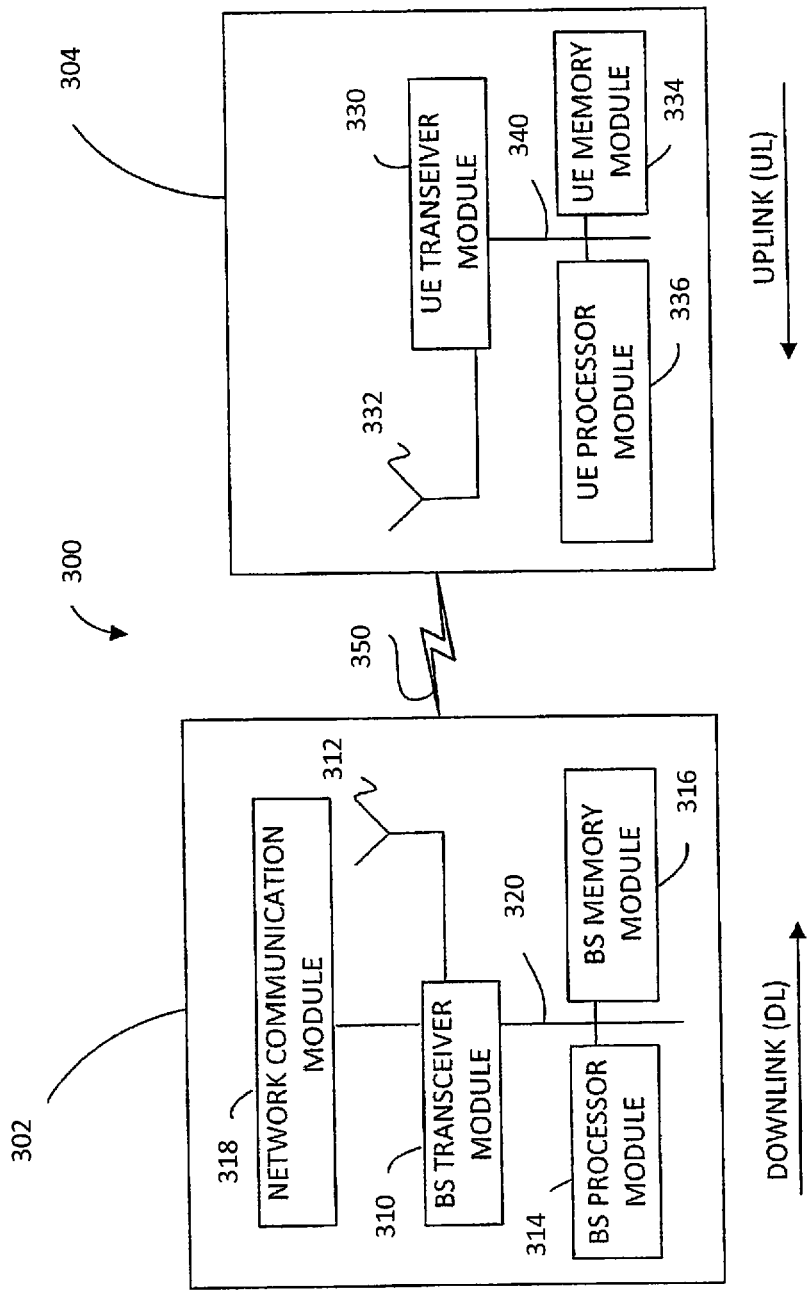
FIG. 3 illustrates block diagrams of an exemplary system including a base station (BS) and user equipment (UE), in accordance with some embodiments.

FIG. 3 illustrates block diagrams of an exemplary system 300 in accordance with some embodiments, including a base station (BS) 302 and user equipment (UE) 304 for transmitting and receiving wireless communication signals, e.g., OFDM/OFDMA signals, between each other. The system 300 may include components and elements configured to support known or conventional operating features that need not be described in detail herein. In one exemplary embodiment, system 300 can be used to transmit and receive data symbols in a wireless communication environment such as the wireless communication environment 200 of FIG. 1, as described above.

The BS 302 includes a BS transceiver module 310, a BS antenna 312, a BS processor module 314, a BS memory module 316, and a network communication module 318, each module being coupled and interconnected with one another as necessary via a data communication bus 320. The UE 304 includes a UE transceiver module 330, a UE antenna 332, a UE memory module 334, and a UE processor module 336, each module being coupled and interconnected with one another as necessary via a data communication bus 340. The BS 302 communicates with the UE 304 via a communication channel (e.g., link) 350, which can be any wireless channel or other medium known in the art suitable for transmission of data as described herein.

Furthermore, the system 300 may facilitate the performance of edge computing by offloading cloud computing services for the UE 304 closer to the UE 304. For example, cloud computing may be performed for the UE 304 at the BS 302 and/or at the UE 304 itself. This may contrast with traditional cloud computing services where such cloud computing services for the UE 304 would be relayed by the BS 302 to a remote server or farm of computers for processing.

As would be understood by persons of ordinary skill in the art, system 300 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 330 may be referred to herein as an "uplink" transceiver 330 that includes a RF transmitter and receiver circuitry that are each coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes RF transmitter and receiver circuitry that are each coupled to the antenna 312. A downlink duplex switch may alternatively couple the downlink transmitter or receiver to the downlink antenna 312 in time duplex fashion. The operations of the two transceivers 310 and 330 are coordinated in time such that the uplink receiver is coupled to the uplink antenna 332 for reception of transmissions over the wireless transmission link 350 at the same time that the downlink transmitter is coupled to the downlink antenna 312. Preferably there is close time synchronization with only a minimal guard time between changes in duplex direction.

The UE transceiver 330 and the base station transceiver 310 are configured to communicate via the wireless data communication link 350, and cooperate with a suitably configured RF antenna arrangement 312/332 that can support a particular wireless communication protocol and modulation scheme. In some exemplary embodiments, the UE transceiver 330 and the base station transceiver 310 are configured to support industry standards such as the Long Term Evolution (LTE) and emerging 5G and New Radio (NR) standards, and the like. It is understood, however, that the invention is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory for storing instructions to be executed by the processor modules 314 and 336, respectively.

The network communication module 318 generally represents the hardware, software, firmware, processing logic, and/or other components of the base station 302 that enable bi-directional communication between base station transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)).

Systems and methods in accordance with various embodiments may include a mobile network interaction proxy that facilitates interactions between an edge computing system and a mobile network (e.g., a radio access technology (RAT) such as 5G or 4G). This facilitation may be termed as a mobile network interaction proxy computing process, as will be discussed further below. The mobile network interaction proxy may connect to an operations support system and a mobile edge orchestrator of an edge computing system. Also, the mobile network interaction proxy may connect to a control plane for a particular mobile network, such that user plane data of the mobile network may be directed to the edge computing system as coordinated by the control plane. For example, the mobile network interaction proxy may connect with the mobile network through the policy control function (PCF) if the application function AF, or mobile application, is of a trusted domain, and through the network exposure function (NEF) if the AF is of an untrusted domain. In certain embodiments, the mobile network interaction proxy may be separate from the mobile network or the edge computing system such that the mobile network and the edge computing system do not directly interact with each other. Accordingly, the mobile edge interaction proxy may translate and/or coordinate between the mobile network and the edge computing system and facilitate communication between the mobile network and the edge computing system.

Figure 4:
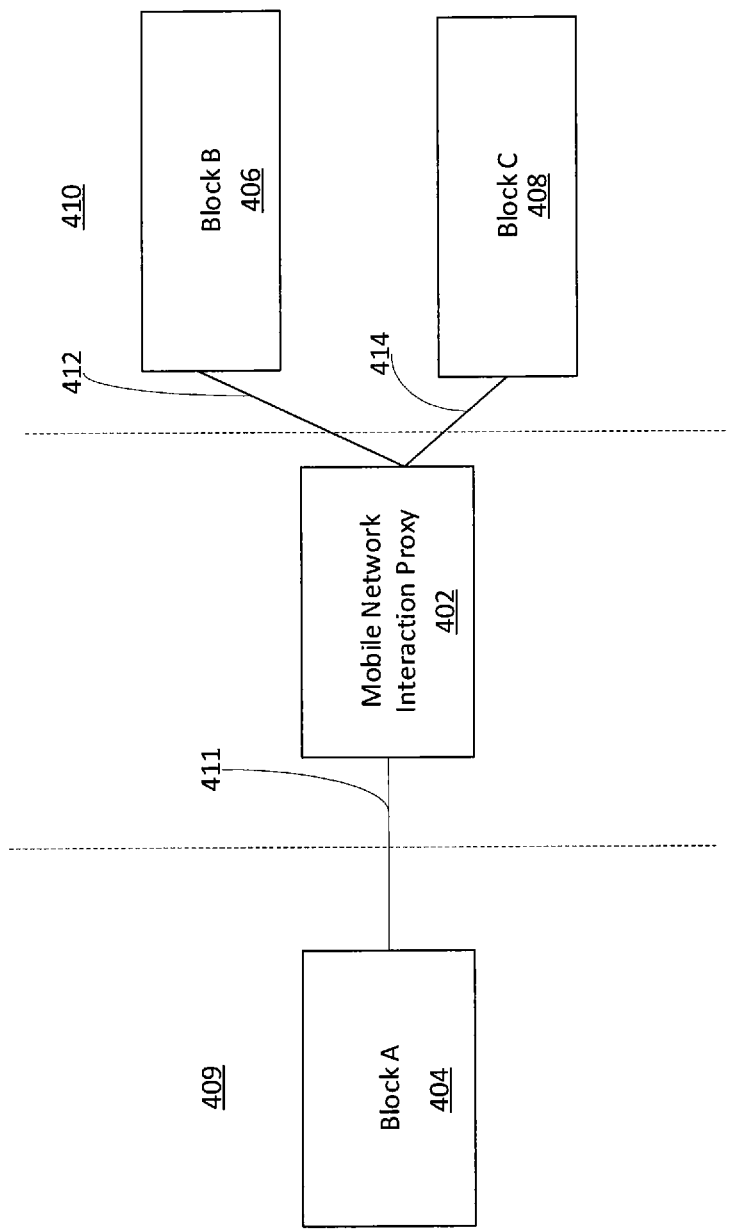
FIG. 4 is a block diagram that illustrates various interactions of a mobile network interaction proxy, in accordance with some embodiments of the invention.

FIG. 4 is a block diagram that illustrates various interactions of a mobile network interaction proxy 402, in accordance with some embodiments of the invention. For ease of discussion, the various functional blocks that the mobile network interaction proxy 402 may interface with are referred to as block A 404, block B 406, and block C 408. Block A 404 may be part of the control plane of a mobile network 409. For example, block A may be the policy control function (PCF), network exposure function (NEF), and/or session management function (SMF), service capability exposure function (SCEF), mobility management entity (MME), and/or policy and changing rules function (PCRF). Block B 406 and block C 408 may be part of an edge computing system 410. For example, block B may be the operations support system (OSS) and block C may be the mobile edge orchestrator (MEO). In certain embodiments, the mobile network interaction proxy 402 may translate a mobile edge computing location list (e.g., a listing of possible mobile edge hosts that may be utilized) provided by the edge computing system for use by corresponding user plane function identifiers. For example, the mobile network interaction proxy 402 may translate or convert edge computing system usable identifiers to mobile network usable identifiers and vice versa.

In various embodiments, the functional blocks of a block diagram (e.g., the mobile network interaction proxy 402, block A 404, block B 406, and block C 408) may or may not represent discrete physical communication nodes. For example, these functional blocks may represent entities running on the top of a virtualization infrastructure. The virtualization infrastructure may be a physical data center on which the virtual machines (VMs) are run and the VMs represent individual functional elements.

In certain embodiments, the interface between the mobile network interaction proxy 402 and block A 404 may be referred to as a first interface 411. For instance, block A 404 (e.g., the PCF or NEF) may provide edge computing parameters (e.g. values associated with edge computing parameters) to enable mobile network 411 data routing for off-loading of processing and communication resources to the edge computing system 410. For simplicity, an edge computing parameter may be more simply referred to as a parameter herein. Through the first interface 411, the mobile network interaction proxy 402 may receive messages from Block A 404 (e.g., route information) so that the mobile network interaction proxy 402 can facilitate use of the edge computing system 410 by the mobile network 409 (e.g., to trigger mobile application lifecycle management at Block B and Block C). Stated another way, the first interface of mobile network interaction proxy 402 may communicate an edge computing traffic steering request (e.g., edge computing service steering request for edge computing service steering or traffic steering) to Block A. In certain embodiments, edge computing service steering (e.g., traffic steering to an edge computing system) may be referred to as edge computing traffic steering and vice versa. The request may contain parameters that may assist in routing (e.g., offloading) computing and communication resources from the mobile network 409 to the edge computing system 410. Examples of parameters that may be communicated across the first interface 411 may include at least one of: a network name, that identifies the network domain of the edge computing system; a slice identifier, that identifies the slice that is interacting with the edge computing system 410; a user plane function location, that identifies the network function location of the user plane; a mobile application identifier, that identifies the mobile application to be provisioned by the edge computing system; a service steering or traffic steering policy, that identifies the policies applied to the data interface between the user plane and the edge computing system; a service quality identifier, that provides the quality class required by the service (e.g., QoS); a user identifier, that indicates a user or a group of user terminals or user equipment; a session event subscription number, that is the subscription number (e.g., subscription identifier) corresponding to the user plane function selection/re-selection/release operations.

In certain embodiments, specific parameters may be communicated between block A 404 and the mobile network interaction proxy 402 across the first interface 411. For example, the mobile network interaction proxy 402 may receive specific parameters from block A 404 via the first interface 411. Specifically, the mobile network interaction proxy 402 may receive an edge computing traffic steering response (e.g., a response to the edge computing service steering request mentioned above) from block A 404. This response may include information such as a success indication (e.g., an indication of service provision success) or a failure indication (e.g., a service provision failure notification and/or failure codes indicating why a failure has occurred). In particular embodiments, the mobile network interaction proxy 402 may receive, via the first interface 411, the notification of user plane function selection, sent by block A 404. This message may include at least one of: user identifiers, mobile application identifiers, user plane function location identifiers, service and session mode identifiers, user IP addresses and/or service quality identifiers (e.g., QoS class identifier).

In certain embodiments, specific parameters may be communicated between block B 406 and the mobile network interaction proxy 402 across the second interface 412. For example, the mobile network interaction proxy 402 may receive specific parameters with block B 406 via the second interface 412. Specifically, the mobile network interaction proxy 402 may acquire a mobile application identifier, user identifier and service quality identifier (e.g., QoS class identifier) from block B 406, as desired for service provisioning (e.g., facilitating interactions between an edge computing system and a mobile network) by interaction with block B through the second interface.

The mobile network interaction proxy 402 may send to block B 406, through the second interface, a traffic steering request (e.g., a service provision information inquiry). The information associated with the traffic steering request (e.g., a service provision information inquiry) may include at least one of, but is not limited to a data network name and/or slice identifier. Also, the network interaction proxy 402 may receive from Block B, via the second interface 412, a response to the traffic steering request (e.g., a traffic steering response). The response may include at least one of usable service provisioning user identifiers (e.g., user identifiers that may be utilized for service steering or traffic steering), application service identifiers, and/or service quality identifiers. Also, the traffic steering response may include a failure indication and/or failure codes (e.g., codes that may be utilized to identify a cause of failure).

The mobile network interaction proxy 402 may receive from block B 406, via the second interface 412, a traffic steering request (e.g., a service steering request). The traffic steering request (e.g., a service steering or traffic steering request) may include at least one of data network names or identifiers, slice identifiers, user identifiers, application service identifiers, and/or service quality identifiers. The mobile network interaction proxy 402 may send to block B 406, via the second interface 412, a traffic steering response (e.g., a service steering request response or traffic steering request response). The traffic steering response may include at least one of a success indication, failure indication, and/or failure codes.

The mobile network interaction proxy 402 may send to block B 406, via the second interface 412, a mobile application lifecycle management request. The mobile application lifecycle management request may include at least one of: data network names, slice identifiers, user identifiers, mobile application identifiers, user plane function location identifiers, service and session mode identifiers, and/or user IP addresses.

The mobile network interaction proxy receives from Block B, via the second interface, the mobile application lifecycle management response (e.g., a response to the mobile application lifecycle management request). The mobile application lifecycle management response may include a success or failure indication, and/or failure codes.

In certain embodiments, specific parameters may be communicated between block C 408 and the mobile network interaction proxy 402 across the third interface 414. For example, the mobile network interaction proxy 402 may receive a notification from block C 408, via the third interface 414, concerning a mobile application deployment location that is available for Block C 408. Also, the mobile network interaction proxy 402 may receive, via the third interface, a notification of a reconfiguration of the mobile application instance (that is available for block C 408). Accordingly, the mobile network interaction proxy 402 may trigger block C 408 mobile application lifecycle management.

The mobile network interaction proxy 402 may receive from block C, via the third interface 414, a system status query request. This system status query request may include at least one of: data network names, slice identifiers, user identifiers, application identifiers, and/or service quality identifiers (e.g., QoS class identifiers). The mobile network interaction proxy 402 may receive from Block C 408, via the third interface 414, a system status response (e.g., a response to the system status query request). This system status response may include at least one of: success indications, mobile edge host location lists (e.g., a listing of possible mobile edge hosts that may be utilized), the running mobile application identifiers (e.g., identifiers for available mobile applications), and/or user identifiers. Alternatively, the system status response may include a failure indication and/or failure codes.

The mobile network interaction proxy 402 may receive from block C 408 notification of an application instance configuration. The notification of an application instance configuration may include at least one of: data network names, slice identifiers, user identifiers, application identifiers, and/or the mobile edge host location lists. The mobile network interaction proxy 402 may send to block C 408, via the third interface 414, an application instance configuration response (e.g., a response to the application instance configuration). The response may include a success or failure indication, and/or failure codes.

The mobile network interaction proxy 402 may send to block C 408, via the third interface 414, a mobile application lifecycle management request (also termed as a lifecycle management request). The mobile application lifecycle management request may include at least one of data network names or identifiers, slice identifiers, user identifiers, mobile application identifiers, user plane function location identifiers, service and session mode identifiers and/or user IP addresses. The mobile network interaction proxy 402 may send to block C 408, via the third interface 414, a mobile application lifecycle management response (e.g., a response to the mobile application lifecycle management request). The mobile application lifecycle management response may include a success or failure indication and/or information about a mobile edge host location (e.g., a location of a possible mobile edge host that may be utilized).

Figure 5:
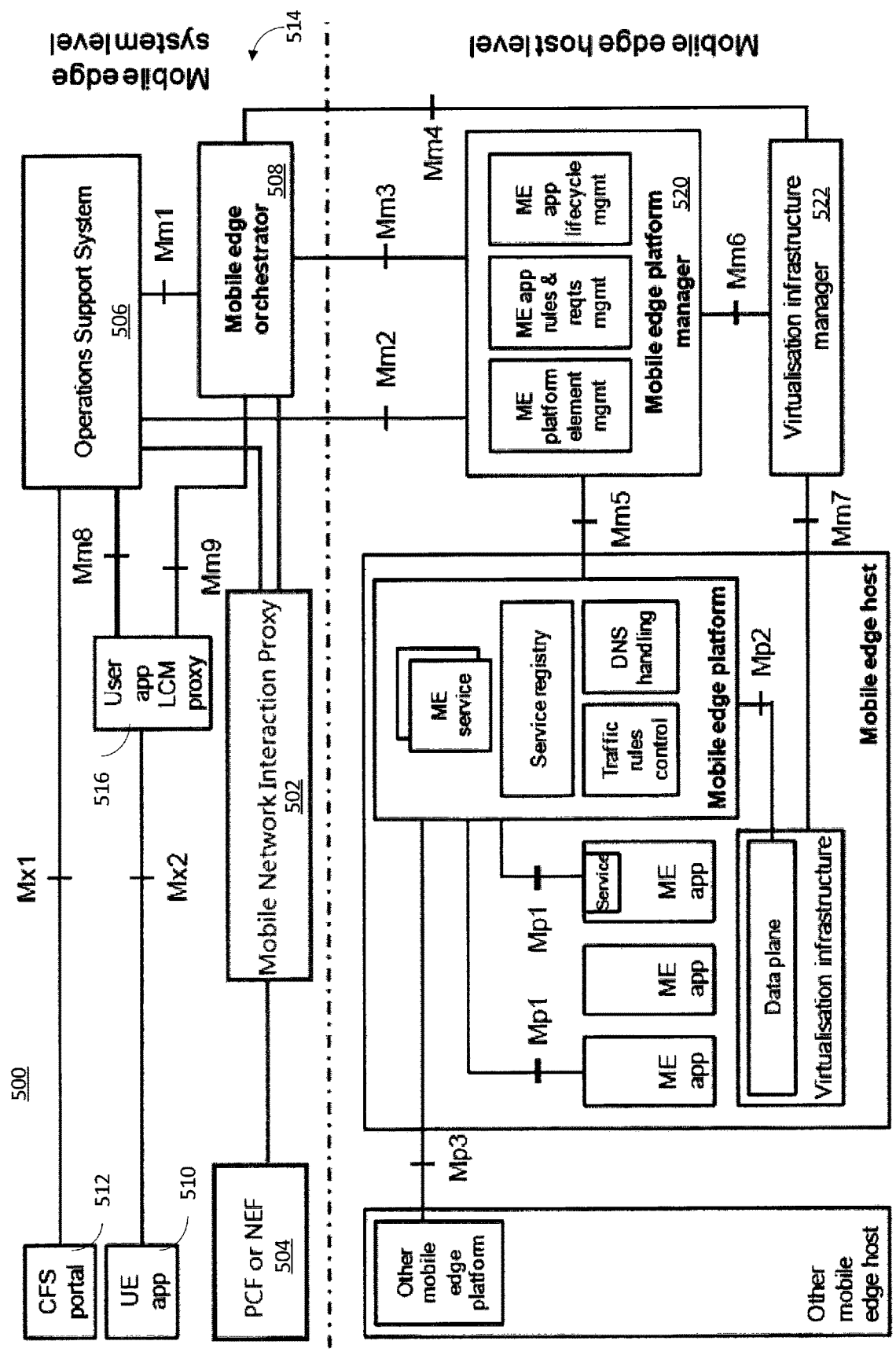
FIG. 5 is a block diagram that illustrates a network topology of a mobile network interaction proxy relative to components of an exemplary ETSI-MEC architecture, in accordance with some embodiments of the invention.

FIG. 5 is a block diagram 500 that illustrates a network topology of a mobile network interaction proxy 502 relative to components of an exemplary ETSI-MEC architecture, in accordance with some embodiments of the invention. As introduced above with reference to FIG. 4, the mobile network interaction proxy 402 may interact with block A 404, block B 406, and block C 408. With regard to FIG. 5, the mobile network interaction proxy 502 may interact with a PCF or NEF 504 (as block A), a operations support system 506 (as block B), and a mobile edge orchestrator 508 (as block C).

As discussed above, the block diagram 500 may be composed of functional blocks (e.g., elements) and reference points allowing interaction among the functional blocks. These functional blocks may not necessarily represent physical communication nodes. For example, they may represent entities running on the top of a virtualization infrastructure. The virtualization infrastructure may be a physical data center on which the virtual machines (VMs) are run and the VMs may represent individual functional block. The edge computing system may be exploited by a UE's mobile application 510 located directly in a UE, or by third party customers (such as commercial enterprise) via customer facing service (CFS) portal 512. Both the UE mobile application 510 and the CFS portal 512 may interact with the edge computing system through the mobile edge system level 514. The mobile edge system level 514 may include a user application (e.g., mobile application) lifecycle management (LCM) proxy 516, which mediate requests, such as initiation, termination or relocations of the UE's mobile application 510 to the operations support system (OSS) 506 of the mobile operator. Then, the OSS 506 decides if requests are granted or not. The granted requests may be forwarded to the mobile edge orchestrator 508. The mobile edge orchestrator 508 may provide core functionality in the mobile edge system level 514 by maintaining an overall view on available computing/storage/network resources and edge computing system services (e.g., various mobile applications hosted by the edge computing system). In this respect, the mobile edge orchestrator 508 may allocate the virtualized resources of the edge computing system to the mobile applications that are about to be initiated depending on the mobile application requirements (e.g., latency). Furthermore, the mobile edge orchestrator 508 may also flexibly scale down or up available resources to already running mobile applications. The mobile edge system level may be interconnected with a mobile edge platform manager 520 and a virtualization infrastructure manager 522. The mobile edge platform manager 520 may manage the life cycle of the mobile applications, application rules and service authorization, traffic rules, etc. The virtualization infrastructure manager 522 may be responsible for allocation, management and release of the virtualized computation/storage resources provided by the virtualization infrastructure located within a server associated with the edge computing system. The remaining functional blocks are discussed above and will not be repeated for brevity.

The different functional blocks of an edge computing system (e.g., operations support system 506 or mobile edge orchestrator 508) may be deployed directly at a base station, at cell aggregation sites or at multi-RAT aggregation points (e.g., multi-mobile network) that can be located either within an enterprise scenario (e.g., a company) or a public coverage scenario (e.g., shopping mall, stadium, airport, etc.) or to move them to the edge of a core network (CN) of a RAT (e.g., a mobile network). Furthermore, reference to an edge computing system may refer to each of the functional blocks of the block diagram 500 except for the mobile network interaction proxy 502 and the PCF or NEF 504.

Figure 6:
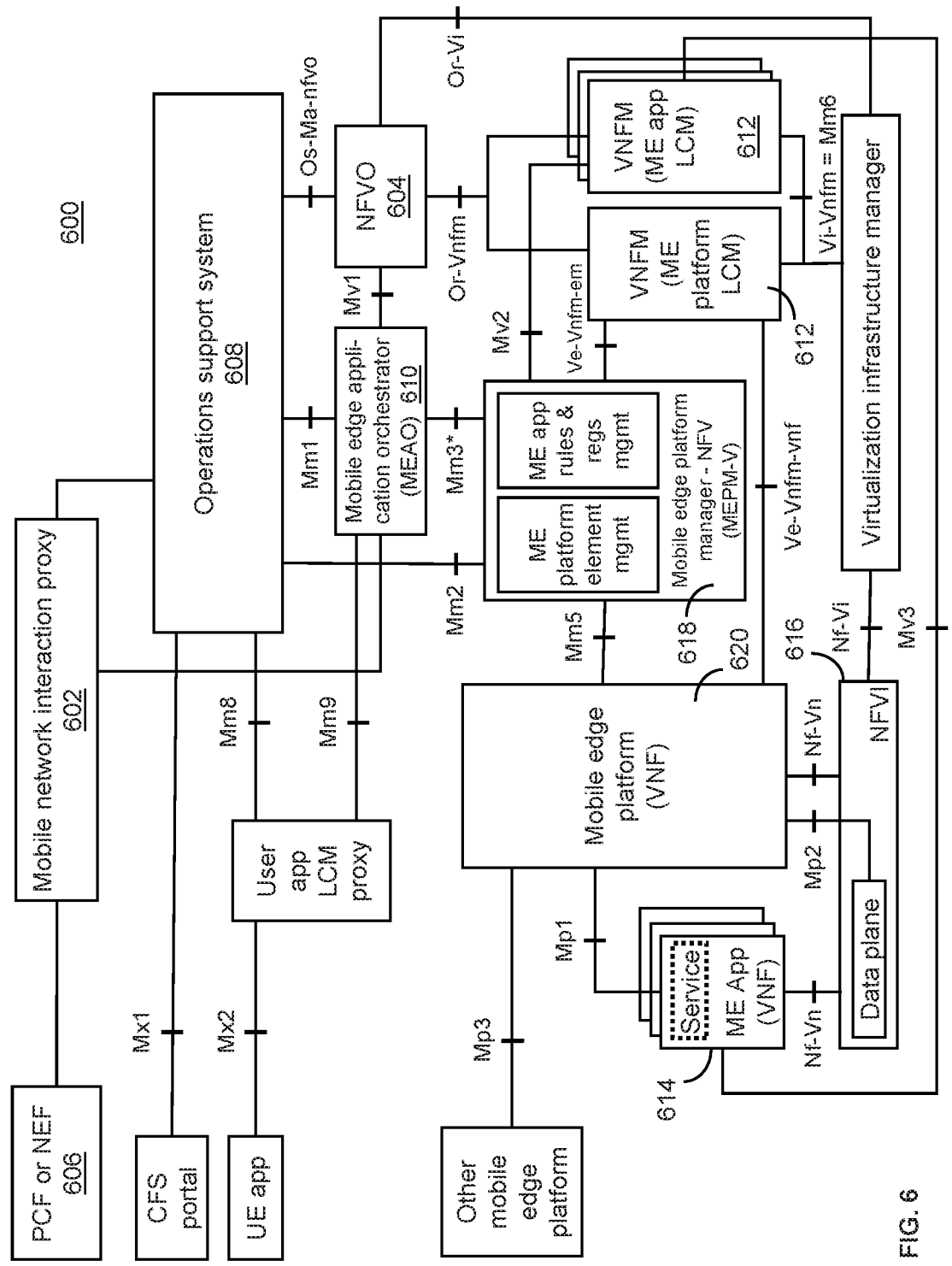
FIG. 6 is a block diagram that illustrates a network topology of a mobile network interaction proxy relative to components of a ETSI-MEC system with a network function virtualization environment orchestrator (NFVO), in accordance with some embodiments of the invention.

FIG. 6 is a block diagram 600 that illustrates a network topology of a mobile network interaction proxy 602 relative to components of a ETSI-MEC system with a network function virtualization environment orchestrator (NFVO) 604, in accordance with some embodiments of the invention. The mobile network interaction proxy 602 may be on the ETSI-MEC system's mobile edge system level.

As introduced above with reference to FIG. 4, the mobile network interaction proxy 402 may interact with block A 404, block B 406, and block C 408. With regard to FIG. 6, the mobile network interaction proxy 602 may interact with a PCF or NEF 606 (as block A), a operations support system 608 (as block B), and a mobile edge orchestrator 610 (as block C) within the ETSI-MEC system with a network function virtualization environment (NFVO) 604. Furthermore, the NFVO 604 may be connected with various virtual network function managers (VNFMs) 612. These VNFMs 612 may manage mobile applications 614 that are part of a virtual network function (VNF). This mobile applications 614 may connect with a network function virtualization infrastructure 616. These VNFMs 612 may also be used to manage virtual instances of a mobile edge platform manager 618 or mobile edge platform 620. The remaining functional blocks are discussed above and will not be repeated for brevity.

Figure 7:
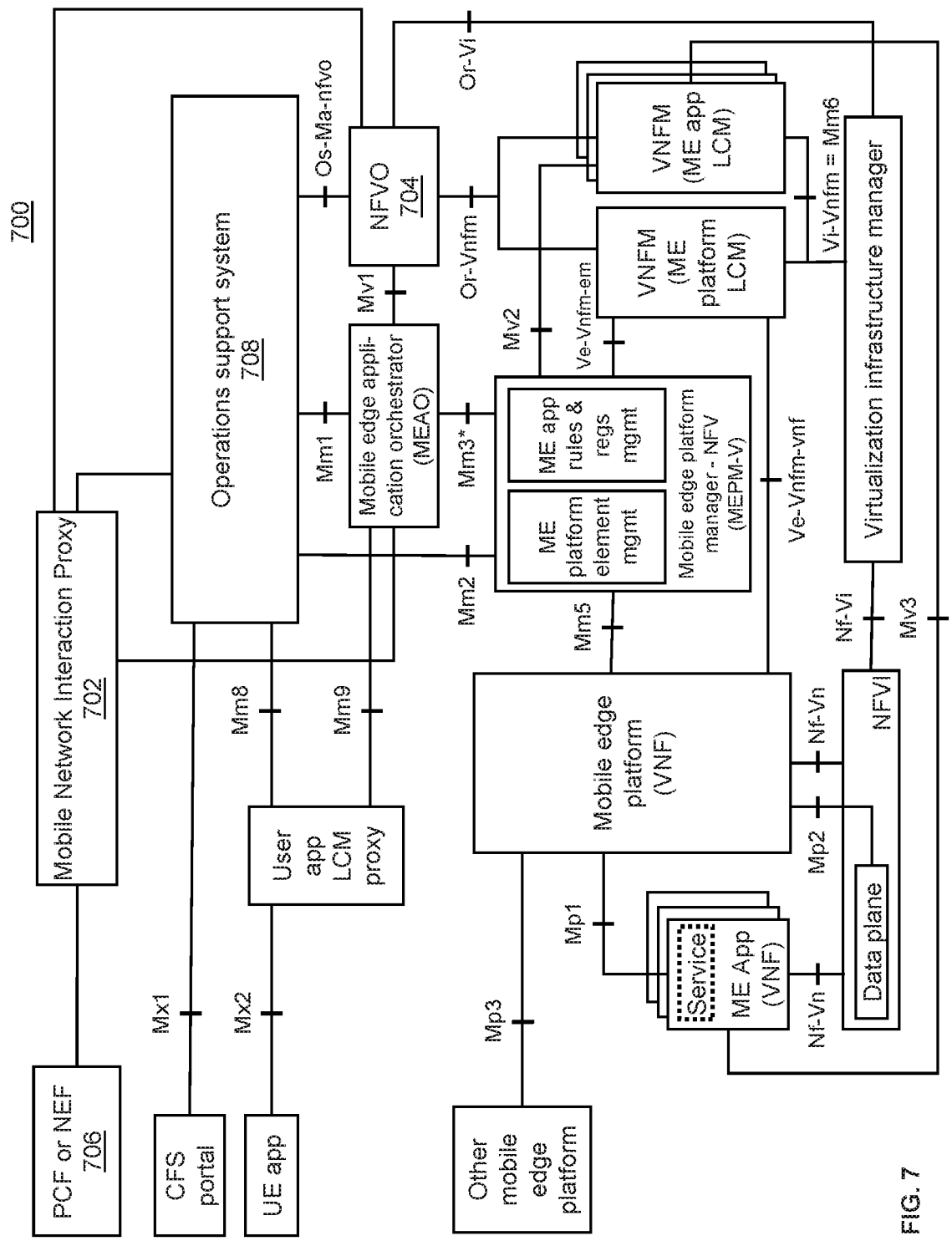
FIG. 7 is a block diagram that illustrates a network topology of a mobile network interaction proxy relative to components of another ETSI-MEC system with a network function virtualization environment orchestrator (NFVO), in accordance with some embodiments of the invention.

FIG. 7 is a block diagram 700 that illustrates a network topology of a mobile network interaction proxy 702 relative to components of another ETSI-MEC system with a network function virtualization environment orchestrator (NFVO) 704, in accordance with some embodiments of the invention. The mobile network interaction proxy 702 may be on the ETSI-MEC system's mobile edge system level. As introduced above with reference to FIG. 4, the mobile network interaction proxy 402 may interact with block A 404, block B 406, and block C 408. With regard to FIG. 7, the mobile network interaction proxy 702 may interact with a PCF or NEF 706 (as block A), a operations support system 708 (as block B), and the NFVO 704 (as block C) within the ETSI-MEC system with a network function virtualization environment (NFVO) 704. The remaining functional blocks are discussed above and will not be repeated for brevity.

Figure 8:
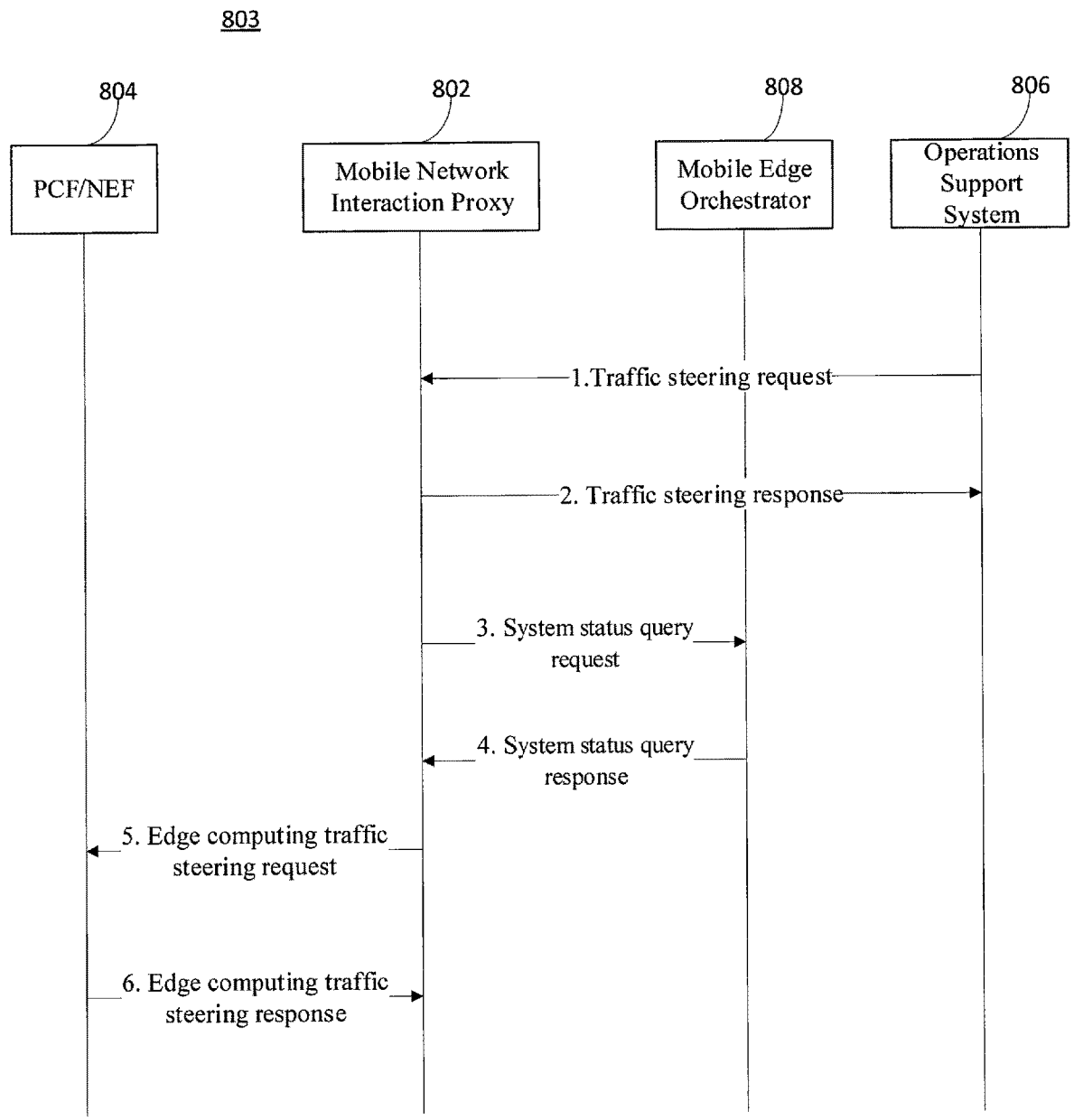
FIG. 8 is a block diagram that illustrates various interactions of a mobile network interaction proxy in an operations support system initiated mobile network interaction proxy computing process, in accordance with some embodiments of the invention.

FIG. 8 is a block diagram that illustrates various interactions of a mobile network interaction proxy 802 in an operations support system (e.g., block B) initiated mobile network interaction proxy computing process 803, in accordance with some embodiments of the invention. This mobile network interaction proxy computing process 803 may be performed between the mobile network interaction proxy 802, a PCF or NEF 804 (as block A, discussed above), a operations support system 806 (as block B, discussed above), and a mobile edge orchestrator 808 (as block C, discussed above).

At operation 1, the operations support system 806 may send a traffic steering request to the mobile network interaction proxy 802 through the second interface (discussed above) to initiate the mobile network interaction proxy computing process. The request message may include at least one of a data network name, slice identifier, user identifier, mobile application identifier, and/or quality of service (QoS) class identifier.

At operation 2, the mobile network interaction proxy 802 may check the information included in the request (e.g., by comparing against acceptable information for the request). For example, the mobile network interaction proxy 802 may check the data network name, slice identifier, user identifier, mobile application identifier, and/or quality of service (QoS) class identifier of the operations support system traffic steering request to determine whether the mobile network interaction proxy 802 may service the operations support system traffic steering request. The mobile network interaction proxy 802 may respond with a traffic steering response that indicates whether the mobile network interaction proxy 802 may service the operations support system traffic steering request. If yes, the mobile network interaction proxy 802 may respond with a success indication to the operations support system 806. If no, the mobile network interaction proxy 802 may respond with a failure indication to the operations support system 806.

At operation 3 the mobile network interaction proxy 802 may send a system status query request to the mobile edge orchestrator 808 through the third interface (discussed above). The system status query request may include at least one of a data network name, slice identifier, user identifier, and/or mobile application identifier. In certain embodiments, at least some of the information included in the system status query request may be the same as the information received in the traffic steering response.

At operation 4, the mobile edge orchestrator 808 may determine whether the mobile edge orchestrator 808 may service (e.g., validity of) the system status query request based on reviewing the received data network name, slice identifier, user identifier, and/or mobile application identifier. If the mobile edge orchestrator 808 may service the system status query request, the mobile edge orchestrator 808 may then query a deployment target (e.g., allocate resources to satisfy the system status query request), such as by allocating a mobile edge host to service the system status query request (e.g., identifying an available edge host location). Also, the mobile edge orchestrator 808 may then generate a system status query response that includes at least one of a success indication, a mobile edge host location list (e.g., a listing of possible mobile edge hosts that may be utilized), a mobile application identifier (e.g., of a mobile application that may be utilized to service the system status query request), and/or a user identifier. If the mobile edge orchestrator 808 may not service the system status query request, then mobile edge orchestrator 808 may send a system status query response that includes a failure indicator and/or failure codes.

At operation 5 mobile network interaction proxy 802 may sends an edge computing traffic steering request to a mobile network's PCF or NEF (e.g., a 5G PCF or NEF) through the first interface (discussed above). The edge computing traffic steering request may include at least one of: a data network name that identifies both the edge computing system's data network domain to which the edge computing system belongs and a corresponding data network name for a mobile network user plane interface; a slice identifier that identifies the network slices that may interface with the edge computing system, such as the network slices associated with the PCF and/or NEF of block A; a user plane function location identifier for a user plane function that may connect with the mobile edge host for mobile application deployment; a quality of service (QoS) class identifier that identifies what quality of service is used for a particular service; a mobile application identifier that identifies which mobile application may utilize edge computing system resources; a routing policy identifier that may be utilized to identify an interface between the user plane and a mobile edge host; a user identifier that may be utilized to identify an individual or a group of users (e.g., terminal devices, such as a mobile station integrated services digital network number (MSISDN); and/or a session event subscription number (e.g., session management function identifier), which may be used to identify the event number corresponding to the an edge communication system session to identify a user plane function selection/reassignment/deletion operation notification message. In certain embodiments, at least some of the information included in the edge computing traffic steering request may be the same as the information received in the system status query response.

At operation 6 the PCF or NEF 804 may check that the parameters associated with the edge computing traffic steering request are valid and processed successfully. If so, the PCF or NEF 804 may send an edge computing traffic steering response to the mobile network interaction proxy 802. This response may be a success or failure indication.

Figure 9:
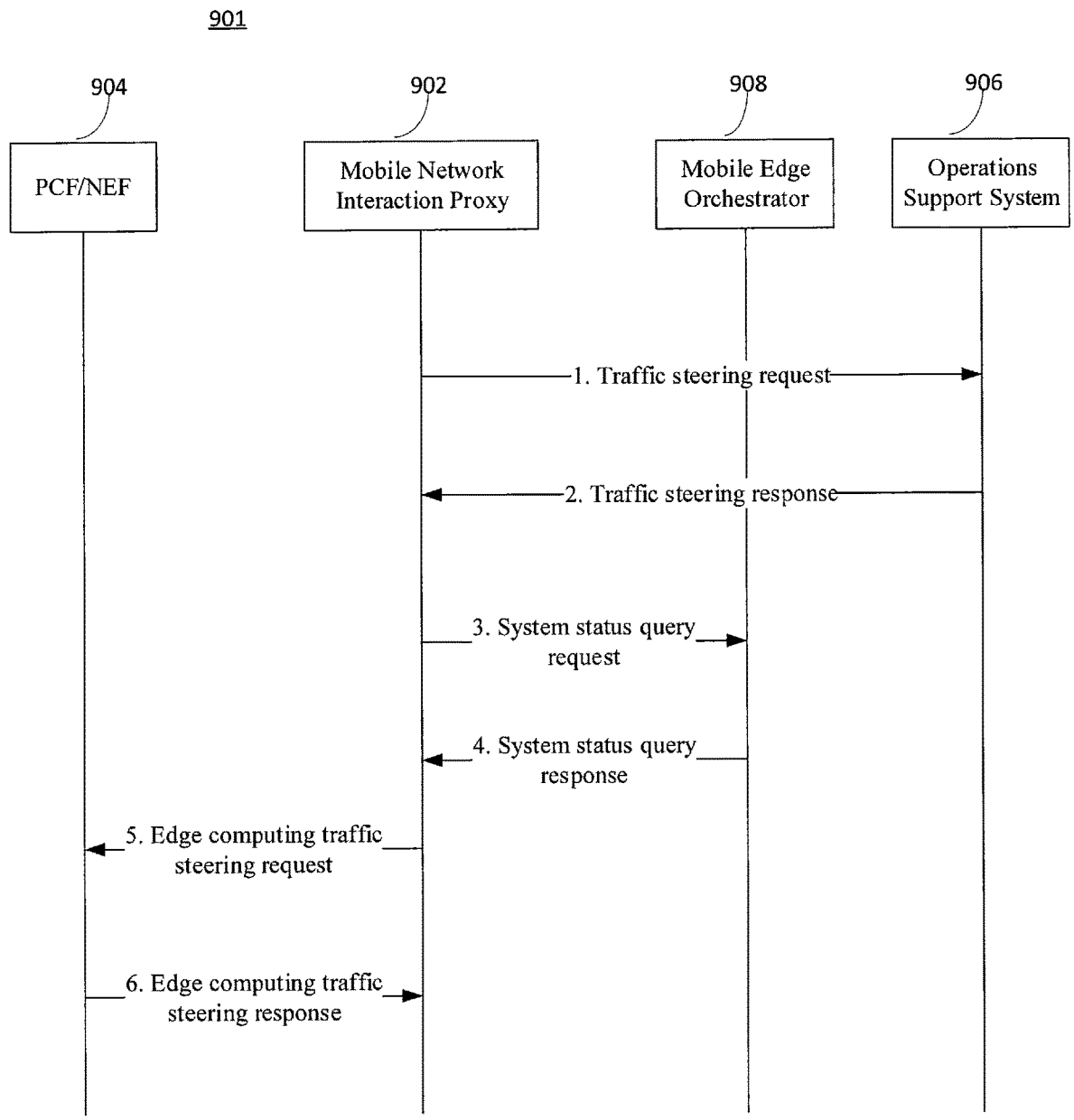
FIG. 9 is a block diagram that illustrates various interactions in a mobile network interaction proxy initiated mobile network interaction proxy computing process, in accordance with some embodiments of the invention.

FIG. 9 is a block diagram that illustrates various interactions in a mobile network interaction proxy initiated mobile network interaction proxy computing process 901, in accordance with some embodiments of the invention. This mobile network interaction proxy computing process 901 may be performed between the mobile network interaction proxy 902, a PCF or NEF 804 (as block A, discussed above), a operations support system 906 (as block B, discussed above), and a mobile edge orchestrator 908 (as block C, discussed above).

At operation 1, the mobile network interaction proxy 902 may send a traffic steering request to the operations support system 906 through the second interface (discussed above) to initiate the mobile network interaction proxy computing process 901. The request message may include a data network name and/or slice identifier.

At operation 2, the operations support system 906 may check the information included in the traffic steering request (e.g., by comparing against acceptable information for the traffic steering request). For example, the operations support system 906 may check the data network name and/or slice identifier of the traffic steering request to determine whether the operations support system 906 may service the traffic steering request. The operations support system 906 may respond to the traffic steering request with a traffic steering response that indicates whether the operations support system 906 may service the operations support system traffic steering request. If yes, the operations support system 906 may respond with a success indication to the mobile network interaction proxy 902. The response with a success indication to the mobile network interaction proxy 902 may also include at least one of a user identifier, mobile application identifier, and/or quality of service (QoS) class identifier. If no, the operations support system 906 may respond with a failure indication to the mobile network interaction proxy 902

At operation 3 the mobile network interaction proxy 902 may send a system status query request to the mobile edge orchestrator 908 through the third interface (discussed above). The system status query request may include at least one of a data network name, slice identifier, user identifier, and/or mobile application identifier. In certain embodiments, at least some of the information included in the system status query request may be the same as information received in the traffic steering response.

At operation 4, the mobile edge orchestrator 908 may determine whether the mobile edge orchestrator 808 may service (e.g., determine the validity of) the system status query request based on reviewing the received data network name, slice identifier, user identifier, and/or mobile application identifier. In certain embodiments, this determination may be made by comparing the information in the system status query request with information that may be known to be acceptable in the system status query request. If the mobile edge orchestrator 908 may service the system status query request, the mobile edge orchestrator 908 may then query a deployment target (e.g., allocate resources to satisfy the system status query request), such as by allocating a mobile edge host to service the system status query request (e.g., identify an available edge host location). Also, the mobile edge orchestrator 908 may then generate a system status query response that includes at least one of a success indication, a mobile edge host location list (e.g., a listing of possible mobile edge hosts that may be utilized), a mobile application identifier (e.g., of a mobile application that may be utilized to service the system status query request), and/or a user identifier. If the mobile edge orchestrator 908 may not service the system status query request, then mobile edge orchestrator 908 may send a system status query response that includes a failure indicator and/or failure codes. This system status query response may be sent (e.g., returned) to the mobile network interaction proxy 902.

At operation 5 mobile network interaction proxy 802 may sends an edge computing traffic steering request to a mobile network's PCF or NEF (e.g., a 5G PCF or NEF) through the first interface (discussed above). The edge computing traffic steering request may include at least one of: a data network name that identifies both the edge computing system's data network domain to which the edge computing system belongs and a corresponding data network name for a mobile network user plane interface; a slice identifier that identifies the network slices that may interface with the edge computing system, such as the network slices associated with the PCF and/or NEF of block A; a user plane function location identifier for a user plane function that may connect with the mobile edge host for mobile application deployment; a quality of service class identifier that identifies what quality of service is used for a particular service; a mobile application identifier that identifies which mobile application may utilize edge computing system resources; a routing policy identifier that may be utilized to identify an interface between the user plane and a mobile edge host; a user identifier that may be utilized to identify an individual or a group of users (e.g., terminal devices, such as a mobile station integrated services digital network number (MSISDN); and/or a session event subscription number (e.g., session management function identifier), which may be used to identify the event number corresponding to the an edge communication system session to identify a user plane function selection/reassignment/deletion operation notification message. In certain embodiments, at least some of the information included in the edge computing traffic steering request may be the same as information received in the system status query response.

At operation 6 the PCF or NEF 804 may check that the parameters associated with the edge computing traffic steering request are valid and processed successfully. If so, the PCF or NEF 804 may send an edge computing traffic steering response to the mobile network interaction proxy 802. This response may be a success or failure indication.

Figure 10:
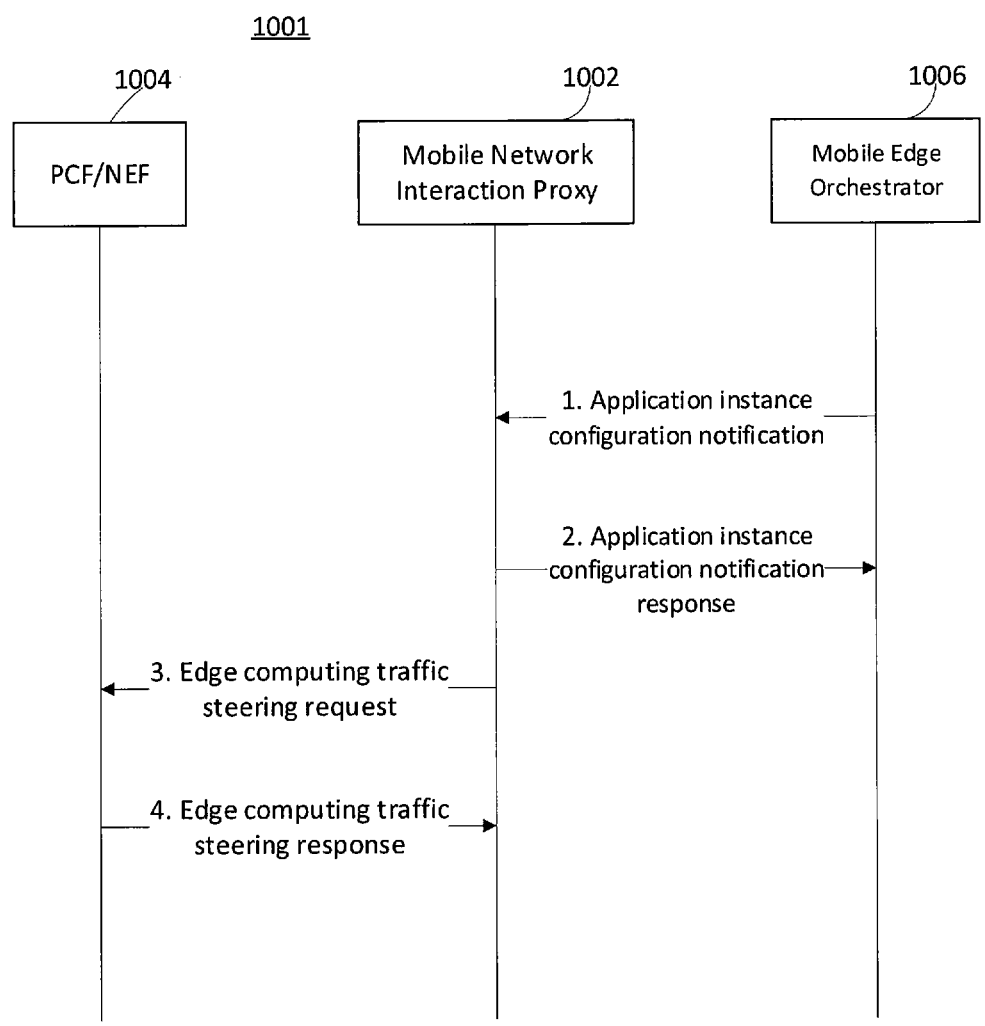
FIG. 10 is a block diagram that illustrates various interactions in a mobile edge orchestrator initiated mobile network interaction proxy computing process, in accordance with some embodiments of the invention.

FIG. 10 is a block diagram that illustrates various interactions in a mobile edge orchestrator initiated mobile network interaction proxy computing process 1001, in accordance with some embodiments of the invention. This mobile network interaction proxy computing process 1001 may be performed between the mobile network interaction proxy 1002, a PCF or NEF 1004 (as block A, discussed above), and a mobile edge orchestrator 1006 (as block C, discussed above). This mobile network interaction proxy computing process 1003 may be triggered when the mobile edge orchestrator 1006 initiates a mobile application instance migration (e.g., movement of a mobile application form one mobile edge host to another). Accordingly, as a precursor to this mobile network interaction proxy computing process 1003, the mobile network interaction proxy 1002 may have already have access to a user identifier, mobile application identifier and/or QoS class identifier as provided by an operations support system (block B, discussed above).

At operation 1, the mobile edge orchestrator 1006 may send an application instance configuration notification to the mobile network interaction proxy 1002 through the third interface (discussed above). The application instance configuration notification may include at least one of a data network name, slice identifier, user identifier, mobile application identifier, and/or a mobile edge host location list (e.g., a listing of possible mobile edge hosts that may be utilized). In certain embodiments, at least some of the information included in the application instance configuration notification may be the same as information received by the operations support system.

At operation 2, the mobile network interaction proxy 1002 may determine whether the mobile network interaction proxy 1002 may act on (or may determine the validity of) the application instance configuration notification based on reviewing the received data network name, slice identifier, user identifier, mobile application identifier, and/or mobile edge host location list. If the mobile network interaction proxy 1002 may act on the application instance configuration notification, the mobile network interaction proxy 1002 may then translate the received mobile edge host location list into a mobile edge host location list of mobile edge hosts that may be utilized by the user identified in the received user identifier. Also, the mobile network interaction proxy 1002 may generate an application instance configuration notification response that includes a success or failure indication (e.g., failure codes) to the mobile edge orchestrator 1006.

At operation 3, the mobile network interaction proxy 802 may send an edge computing traffic steering request to a mobile network's PCF or NEF (e.g., a 5G PCF or NEF) through the first interface (discussed above). The edge computing traffic steering request may include at least one of: a data network name that identifies both the edge computing system's data network domain to which the edge computing system belongs and a corresponding data network name for a mobile network user plane interface; a slice identifier that identifies the network slices that may interface with the edge computing system, such as the network slices associated with the PCF and/or NEF of block A; a user plane function location identifier for a user plane function that may connect with the mobile edge host for mobile application deployment; a quality of service class identifier that identifies what quality of service is used for a particular service; a mobile application identifier that identifies which mobile application may utilize edge computing system resources; a routing policy identifier that may be utilized to identify an interface between the user plane and a mobile edge host; a user identifier that may be utilized to identify an individual or a group of users (e.g., terminal devices, such as a mobile station integrated services digital network number (MSISDN); and/or a session event subscription number (e.g., session management function identifier), which may be used to identify the event number corresponding to the an edge communication system session to identify a user plane function selection/reassignment/deletion operation notification message. In certain embodiments, at least some of the information included in the edge computing traffic steering request may be the same as information received in the application instance configuration notification response.

At operation 4 the PCF or NEF 1004 may check that the parameters associated with the edge computing traffic steering request are valid and processed successfully. If so, the PCF or NEF 1004 may send an edge computing traffic steering response to the mobile network interaction proxy 1002. This response may be a success or failure indication.

Figure 11:
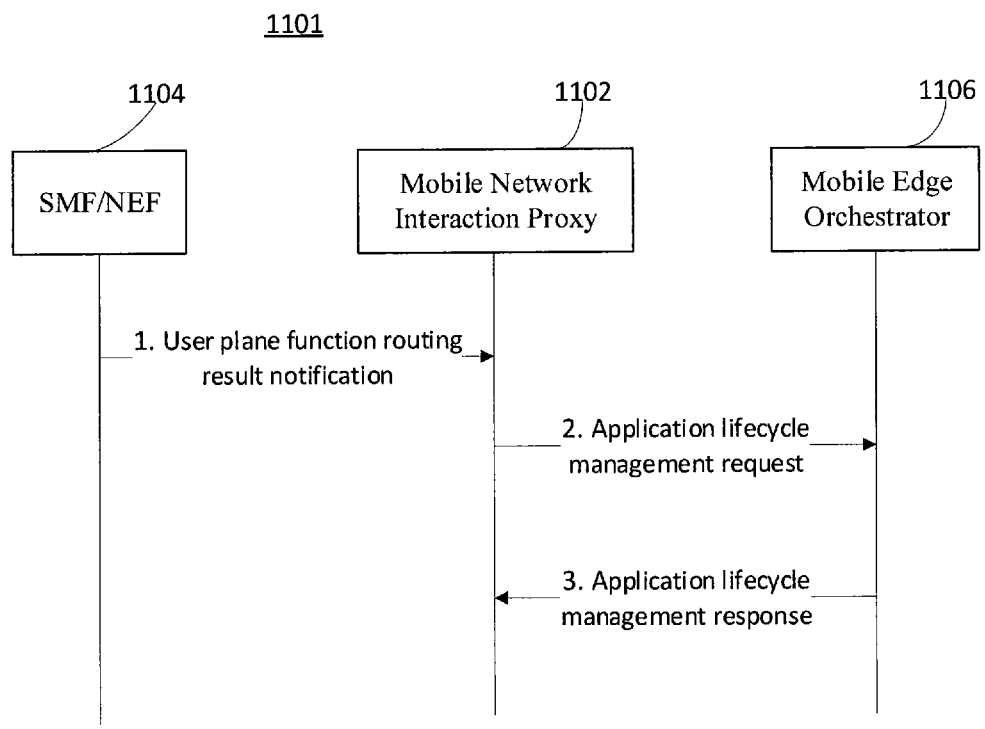
FIG. 11 is a block diagram that illustrates various interactions in a mobile network initiated mobile network interaction proxy computing process, in accordance with some embodiments of the invention.

FIG. 11 is a block diagram that illustrates various interactions in a mobile network initiated mobile network interaction proxy computing process 1101, in accordance with some embodiments of the invention. This mobile network interaction proxy computing process 1101 may be performed between the mobile network interaction proxy 1102, a SMF or NEF 1104 (as block A, discussed above), and a mobile edge orchestrator 1106 (as block C, discussed above).

At operation 1, the SMF or NEF 1104 may send a user plane function routing result notification to the mobile network interaction proxy 1102. This may be sent via the first interface (discussed above). This user plane function routing result notification may include at least one of a user identifier, a user plane function location identifier, a mobile application identifier, service and session mode identifiers, an internet protocol address for a user, and/or a QoS class identifier.

At operation 2, the mobile network interaction proxy 1102 may send a mobile application lifecycle management request to the mobile edge orchestrator 1106 via the third interface (discussed above), including a data network name, slice identifier, user identifier, mobile application identifier, user plane function identifier, service and session mode identifiers, and/or an internet protocol address for a user. In certain embodiments, at least some of the information included in the mobile application lifecycle management request may be the same as information received in the user plane function routing result notification.

At operation 3, the mobile edge orchestrator 1106 via the third interface may send a mobile application lifecycle management response to the mobile network interaction proxy 1102. The mobile application lifecycle management response may include a success indication and/or an edge host location. In other embodiments, the mobile application lifecycle management response may include a failure indication and/or failure codes. The mobile application lifecycle management response may be based on an evaluation of the information included in the mobile application lifecycle management request (e.g., by comparing the included information with acceptable information).

Figure 12:
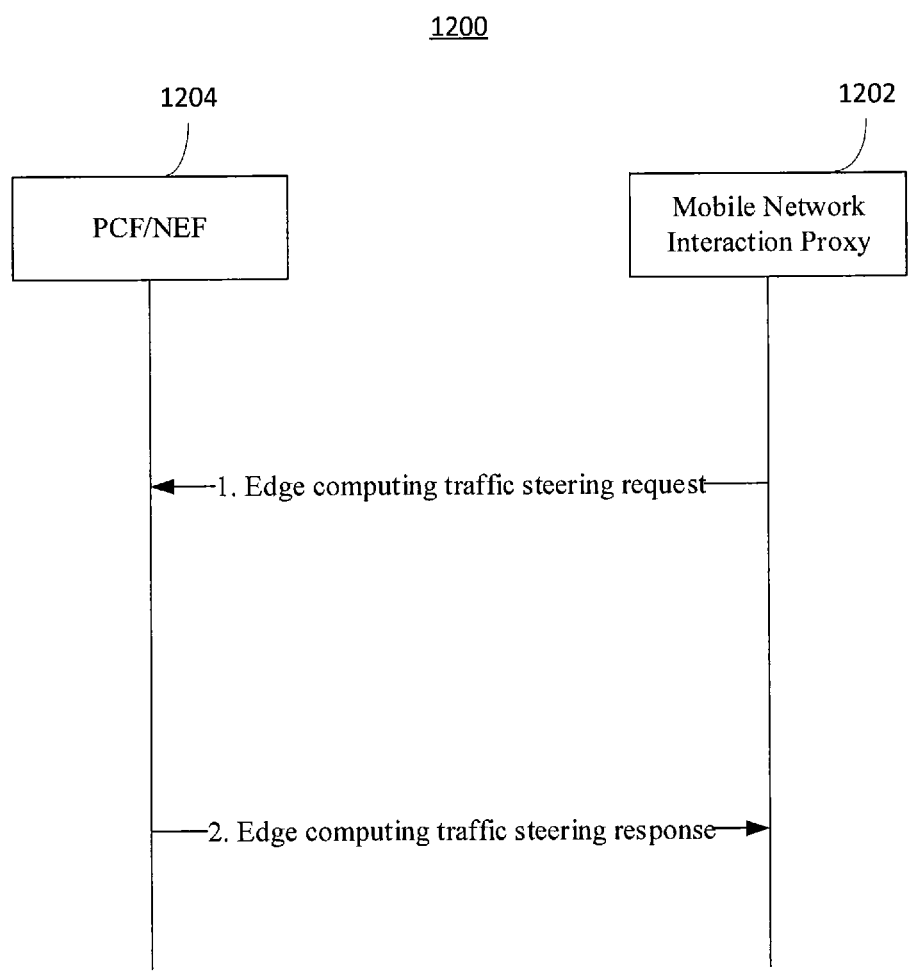
FIG. 12 is a block diagram that illustrates an edge computing traffic steering request process, in accordance with some embodiments of the invention.

FIG. 12 is a block diagram that illustrates an edge computing traffic steering request process 1200, in accordance with some embodiments of the invention. The edge computing traffic steering request may configure a control plane of a mobile network to route user plane information to an edge computing system (e.g., offload processing from a mobile network to the edge computing system). The edge computing traffic steering request process 1200 may be performed by a mobile network interaction proxy 1202 and a PCF or NEF 1204 (block A, discussed above).

At operation 1, the mobile network interaction proxy 1202 may sends an edge computing traffic steering request (e.g., an edge computing service routing request message) to a mobile network's PCF or NEF (e.g., a 5G PCF or NEF) through the first interface (discussed above). The edge computing traffic steering request may include at least one of: a data network name that identifies both the edge computing system's data network domain to which the edge computing system belongs and a corresponding data network name for a mobile network user plane interface; a slice identifier that identifies the network slices that may interface with the edge computing system, such as the network slices associated with the PCF and/or NEF of block A; a user plane function location identifier for a user plane function that may connect with the mobile edge host for mobile application deployment; a quality of service class identifier that identifies what quality of service is used for a particular service; a mobile application identifier that identifies which mobile application may utilize edge computing system resources (e.g., which service or mobile application is to be offloaded for performance using an edge computing host); a routing policy identifier that may be utilized to identify an interface between the user plane and a mobile edge host; a user identifier that may be utilized to identify an individual or a group of users (e.g., terminal devices, such as a mobile station integrated services digital network number (MSISDN); and/or a session event subscription number (e.g., session management function identifier), which may be used to identify the event number corresponding to the an edge communication system session to identify a user plane function selection/reassignment/deletion operation notification message.

At operation 2 the PCF or NEF 1204 may check that the parameters associated with the edge computing traffic steering request are valid and processed successfully. If so, the PCF or NEF 1204 may send an edge computing traffic steering response to the mobile network interaction proxy 1202. This response may include a success or failure indication.

Figure 13:
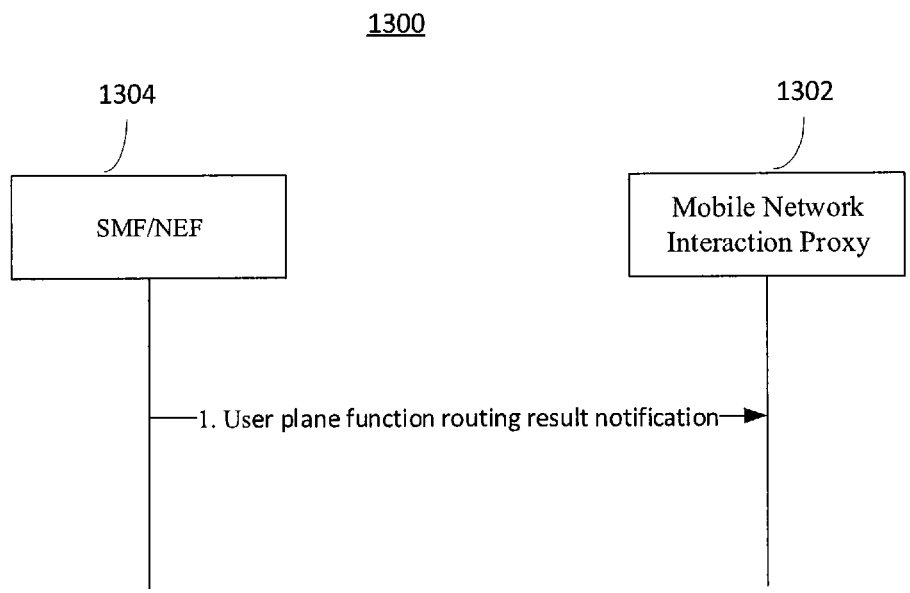
FIG. 13 is a block diagram that illustrates a user plane function routing result notification process, in accordance with some embodiments of the invention.

FIG. 13 is a block diagram that illustrates a user plane function routing result notification process 1301, in accordance with some embodiments of the invention. This user plane function routing result notification process 1301 may be performed between the mobile network interaction proxy 1302, and a SMF or NEF 1304 (as block A, discussed above).

At operation 1, the SMF or NEF 1304 may send a user plane function routing result notification to the mobile network interaction proxy 1302. This may be sent via the first interface (discussed above). This user plane function routing result notification may include at least one of a user identifier, a user plane function location identifier, a mobile application identifier, service and session mode identifiers, an internet protocol address for a user, and/or a QoS class identifier.

Figure 14:
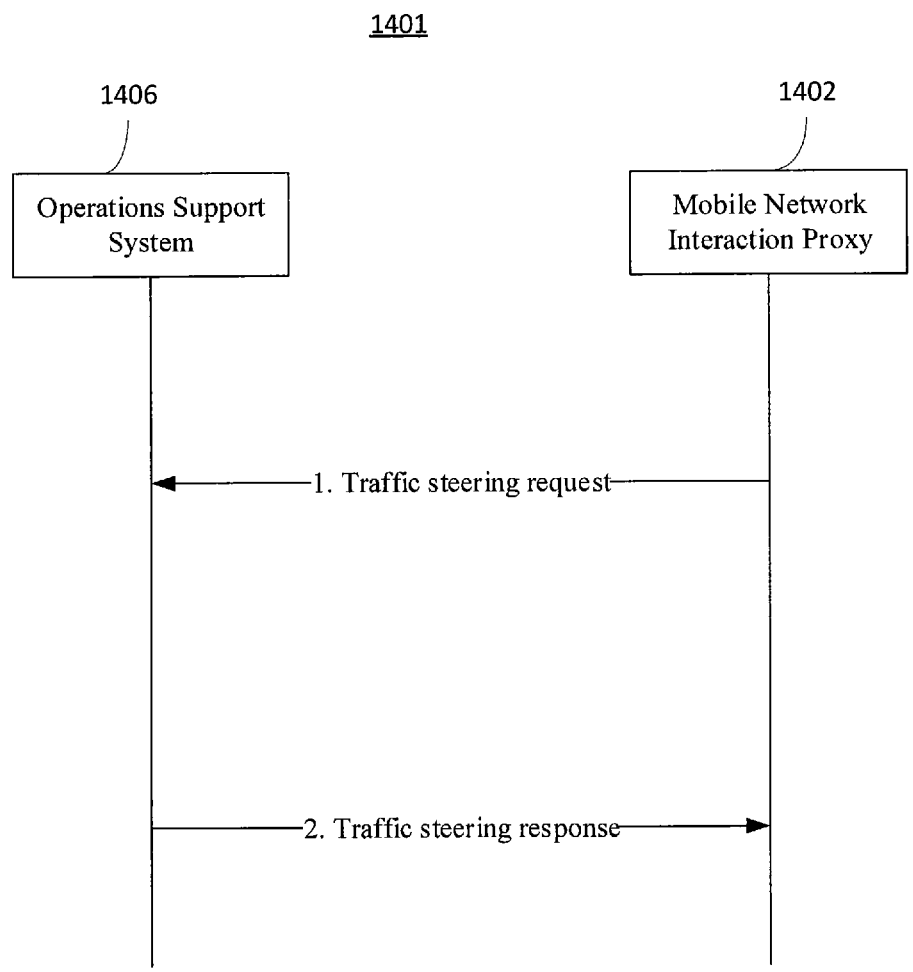
FIG. 14 is a block diagram that illustrates a traffic steering request process, in accordance with some embodiments of the invention.

FIG. 14 is a block diagram that illustrates a traffic steering request process 1401 for traffic steering information, in accordance with some embodiments of the invention. This traffic steering request process 1401 for traffic steering information may be performed between the mobile network interaction proxy 1402, and a operations support system 1406 (as block B, discussed above).

At operation 1, the mobile network interaction proxy 1402 may send a traffic steering request for traffic steering information to the operations support system 1406 through the second interface (discussed above) to initiate the traffic steering request process 1401. The request message may include a data network name and/or slice identifier.

At operation 2, the operations support system 1406 may receive the traffic steering request for traffic steering information and check the information included in the request. For example, the operations support system 1406 may check the data network name and/or slice identifier of the operations support system traffic steering request to determine whether the operations support system 1406 may service the operations support system traffic steering request for traffic steering information. The operations support system 1406 may respond with a traffic steering response that indicates whether the operations support system 1406 may service the operations support system traffic steering request for traffic steering information.

If yes, the operations support system 1406 may respond with a success indication to the mobile network interaction proxy 1402. The response with a success indication to the mobile network interaction proxy 1402 may also include at least one of a user identifier (e.g., for a user that may utilize the edge computing system), mobile application identifier, and/or quality of service (QoS) class identifier. If no, the operations support system 1406 may respond with a failure indication to the mobile network interaction proxy 1402. The failure indication may include failure codes that indicate a reason for the failure.

Figure 15:
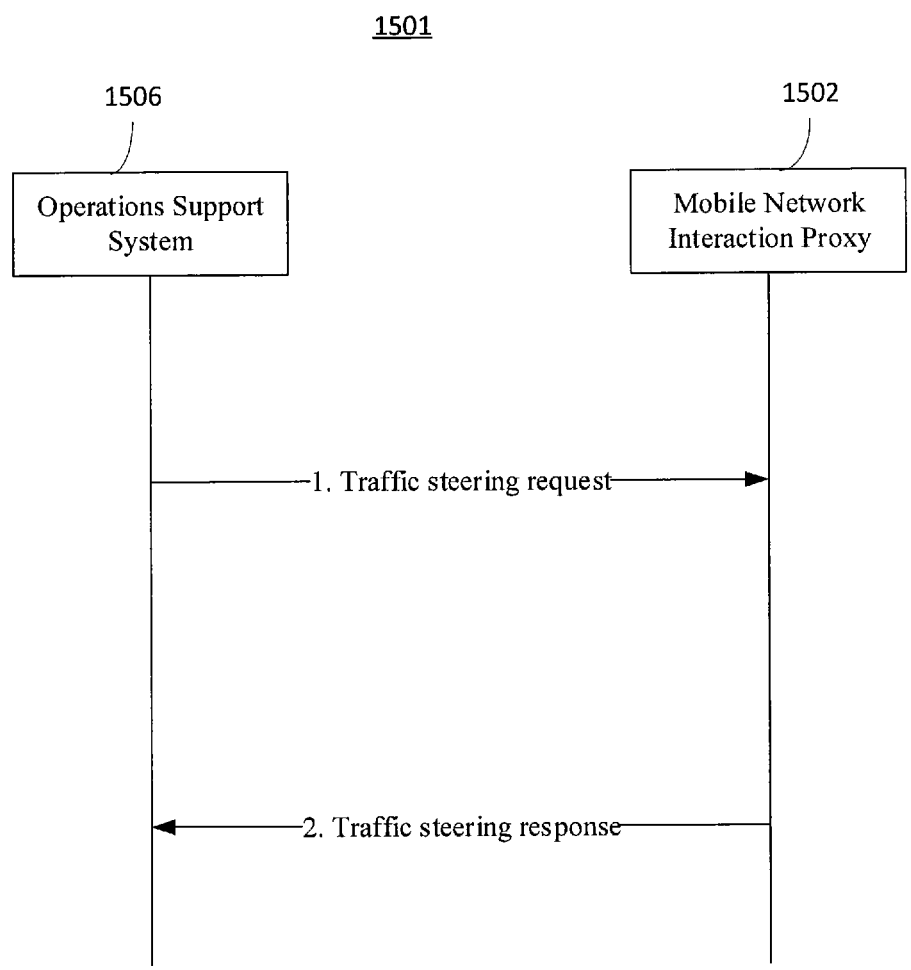
FIG. 15 is a block diagram that illustrates a traffic steering request process sent to a mobile network interaction proxy, in accordance with some embodiments of the invention.

FIG. 15 is a block diagram that illustrates a traffic steering request process 1501 sent to a mobile network interaction proxy 1502, in accordance with some embodiments of the invention. This mobile network interaction proxy computing process 1501 may be performed between the mobile network interaction proxy 1502, and an operations support system 1506 (as block B, discussed above).

At operation 1, the operations support system 1506 may send a traffic steering request to the mobile network interaction proxy 1502 through the second interface (discussed above) to initiate the mobile network interaction proxy computing process. The request message may include at least one of a data network name, user identifier, mobile application identifier, and/or quality of service (QoS) class identifier. In certain embodiments, the request message may include a slice identifier.

At operation 2, the mobile network interaction proxy 1502 may receive the operations support system's traffic steering request. The mobile interaction proxy 1502 may check the information included in the request. For example, the mobile network interaction proxy 1502 may check the data network name, slice identifier, user identifier, mobile application identifier, and/or quality of service (QoS) class identifier of the operations support system traffic steering request to determine whether the mobile network interaction proxy 1502 may service the operations support system's traffic steering request. The mobile network interaction proxy 1502 may respond with a traffic steering response that indicates whether the mobile network interaction proxy 1502 may service the operations support system traffic steering request. If yes, the mobile network interaction proxy 1502 may respond with a success indication to the operations support system 1506. If no, the mobile network interaction proxy 1502 may respond with a failure indication (and/or failure codes) to the operations support system 1506

Figure 16:
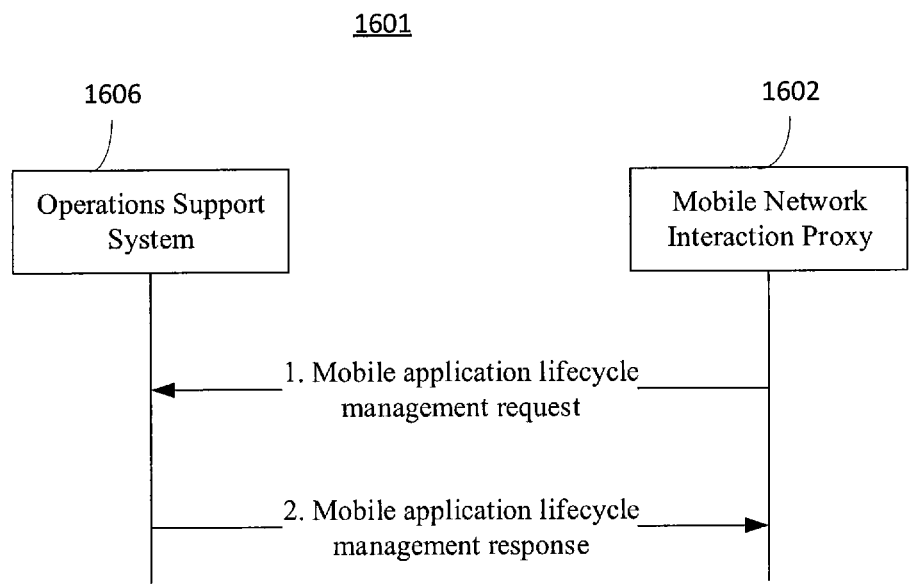
FIG. 16 is a block diagram that illustrates a mobile application lifecycle management request process with an operations support system, in accordance with some embodiments of the invention.

FIG. 16 is a block diagram that illustrates a mobile application lifecycle management request process 1601, in accordance with some embodiments of the invention. This mobile application lifecycle management request process 1601 may be performed between the mobile network interaction proxy 1602, and an operations support system 1606 (as block B, discussed above).

At operation 1, the mobile network interaction proxy 1602 may send a mobile application lifecycle management request to the operations support system 1606 through the second interface (discussed above) to initiate the mobile application lifecycle management request process 1601. The request message may include at least one of a data network name, slice identifier, user identifier, mobile application identifier, user plane function location identifier, service and session mode identifier (e.g., service and call mode identifier), and/or user IP address.

At operation 2, the operations support system 1606 may check the information included in the request. For example, the operations support system 1606 may check the information included in the request to determine whether the operations support system 1606 may service the mobile application lifecycle management request. The operations support system 1606 may respond with a mobile application lifecycle management response that indicates whether the operations support system 1606 may service the mobile application lifecycle management request.

If yes, the operations support system 1606 may respond with a success indication to the mobile network interaction proxy 1602. The response with a success indication to the mobile network interaction proxy 1602 may also include the location of a mobile edge host (e.g., mobile edge computer). If no, the operations support system 1606 may respond with a failure indication to the mobile network interaction proxy 1602. The failure indication may include failure codes that indicate the reasons for the failure.

Figure 17:
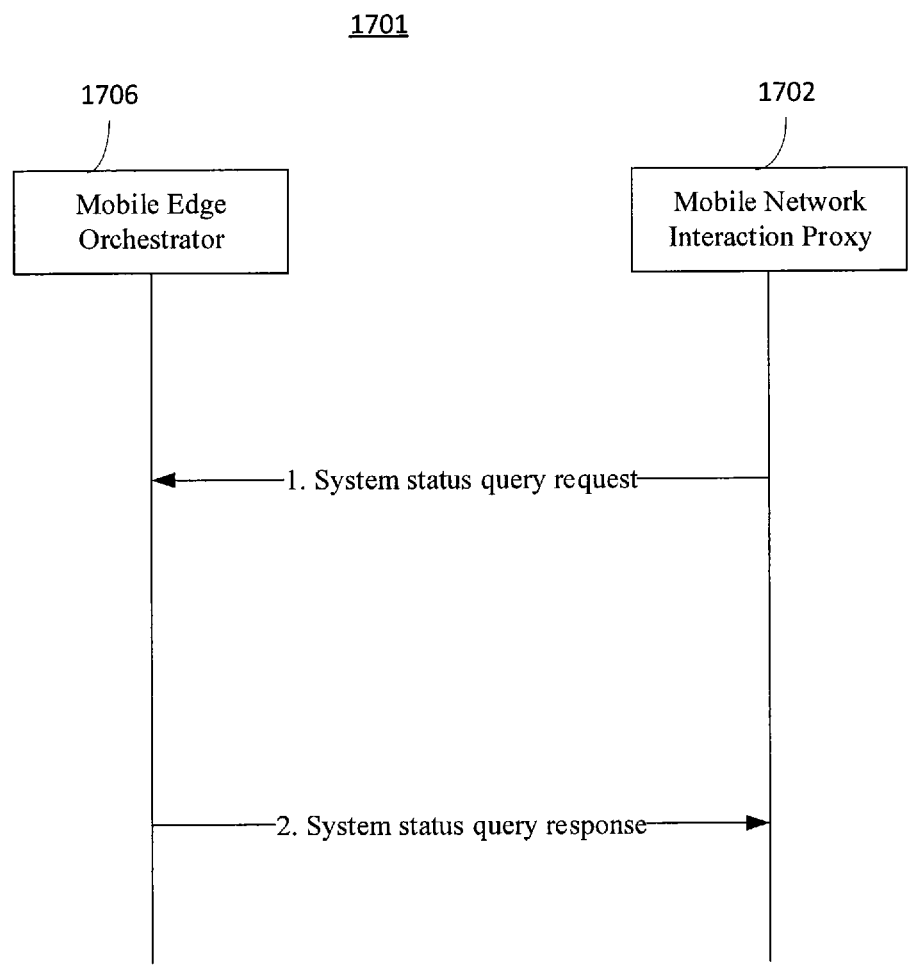
FIG. 17 is a block diagram that illustrates a system status query request process, in accordance with some embodiments of the invention.

FIG. 17 is a block diagram that illustrates a system status query request process 1701, in accordance with some embodiments of the invention. This system status query request process 1701 may be performed between the mobile network interaction proxy 1702 and a mobile edge orchestrator 1708 (as block C, discussed above).

At operation 1, the mobile network interaction proxy 1702 may send a system status query request to the mobile edge orchestrator 1708 through the third interface (discussed above). The system status query request may include at least one of a data network name, slice identifier, user identifier, and/or mobile application identifier.

At operation 2, the mobile edge orchestrator 1708 may determine whether the mobile edge orchestrator 1708 may service (e.g., determine the validity of) the system status query request based on reviewing the received data network name, slice identifier, user identifier, and/or mobile application identifier. If the mobile edge orchestrator 1708 may service the system status query request, the mobile edge orchestrator 1708 may then query a deployment target (e.g., allocate resources to satisfy the system status query request), such as by allocating a mobile edge host to service the system status query request (e.g., move an edge host location). Also, the mobile edge orchestrator 1708 may then generate a system status query response that includes at least one of a success indication, a mobile edge host location list (e.g., a listing of possible mobile edge hosts that may be utilized), a mobile application identifier (e.g., of a mobile application that may be utilized to service the system status query request), and/or a user identifier.

In other embodiments, as part of determining whether the mobile edge orchestrator 1708 may service the system status query request, the mobile edge orchestrator 1708 may query a deployment target (e.g., an edge host location) to see whether or not there is an edge host location in accordance with (e.g., that may service) the system status query request. If so, then the mobile edge orchestrator may send that edge host location to the mobile network interaction proxy 1702 as part of the mobile edge host location list with the success indication.

If the mobile edge orchestrator 1708 may not service the system status query request, the mobile edge orchestrator 1708 may generate a system status query response that is a failure indication and/or provide failure codes.

Figure 18:
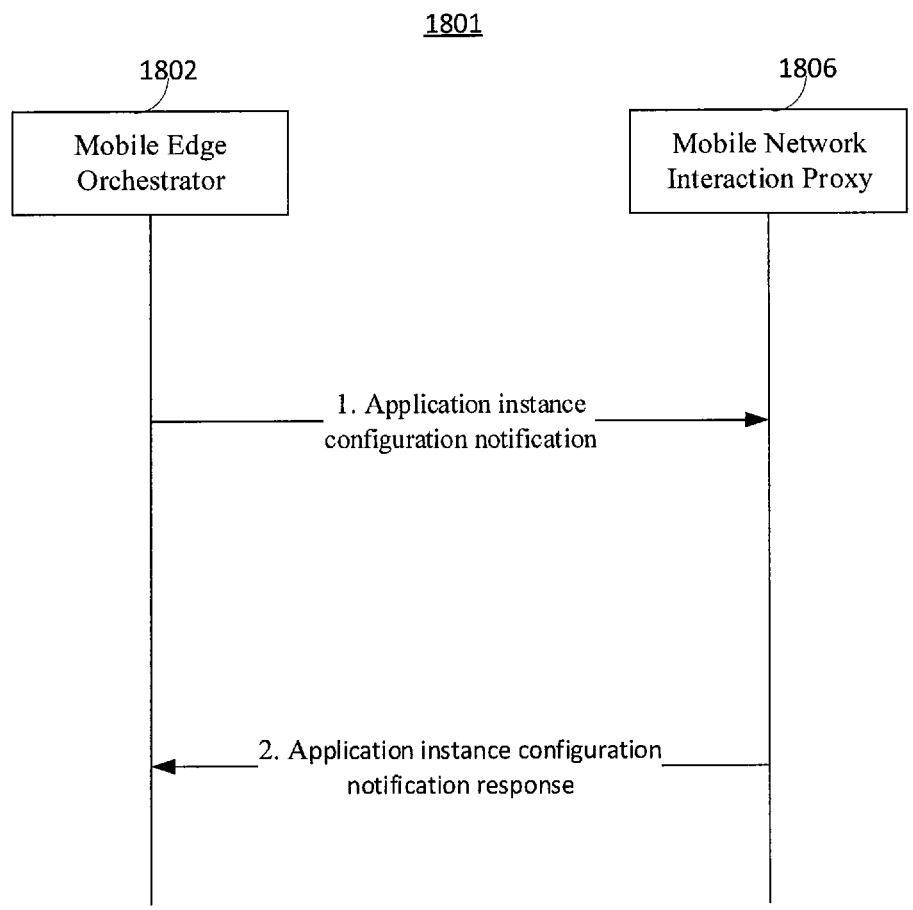
FIG. 18 is a block diagram that illustrates an application instance configuration notification process, in accordance with some embodiments of the invention.

FIG. 18 is a block diagram that illustrates an application instance configuration notification process 1801, in accordance with some embodiments of the invention. This application instance configuration notification process 1801 may be performed between the mobile network interaction proxy 1802 and a mobile edge orchestrator 1806 (as block C, discussed above).

At operation 1, the mobile edge orchestrator 1806 may send an application instance configuration notification to the mobile network interaction proxy 1802 through the third interface (discussed above). The application instance configuration notification may include at least one of a data network name, slice identifier, user identifier, mobile application identifier, and/or a mobile edge host location list (e.g., a listing of possible mobile edge hosts that may be utilized).

At operation 2, the mobile network interaction proxy 1802 may receive the application instance configuration notification from the mobile edge orchestrator 1806. In response to receiving the application instance configuration notification, the mobile network interaction proxy 1802 may determine whether the mobile network interaction proxy 1802 may act on the application instance configuration notification based on reviewing the received data network name, slice identifier, user identifier, mobile application identifier, and/or mobile edge host location list. If the network interaction proxy 1802 may act on the application instance configuration notification, the network interaction proxy 1802 may then translate the received mobile edge host location list into a mobile edge host location list of mobile edge hosts that may be utilized by the user identified in the received user identifier (e.g., utilizable by the user plane associated with a particular user). Also, the mobile network interaction proxy 1802 may generate an application instance configuration notification response that includes a success or failure indication to the mobile edge orchestrator 1006. The success indication may include the mobile edge host location list of mobile edge hosts that may be utilized by the user identified in the received user identifier (e.g., utilizable by the user plane associated with a particular user)

Figure 19:
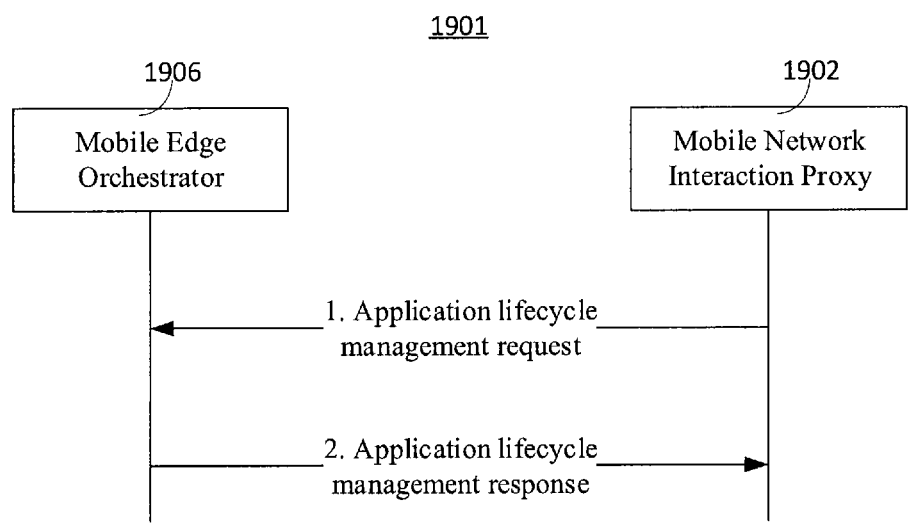
FIG. 19 is a block diagram that illustrates a mobile application lifecycle management request process with a mobile edge orchestrator, in accordance with some embodiments of the invention.

FIG. 19 is a block diagram that illustrates a mobile application lifecycle management request process 1901, in accordance with some embodiments of the invention. This mobile application lifecycle management request process 1901 may be performed between the mobile network interaction proxy 1902 and a mobile edge orchestrator 1906 (as block C, discussed above).

At operation 1, the mobile network interaction proxy 1902 may send a mobile application lifecycle management request message to the mobile edge orchestrator 1906 via the third interface (discussed above), including a data network name, slice identifier, user identifier, mobile application identifier, user plane function identifier, service and session mode identifiers, and/or an internet protocol (IP) address for a user.

At operation 2, the mobile edge orchestrator 1906 via the third interface may send a mobile application lifecycle management response to the mobile network interaction proxy 1902. The mobile application lifecycle management response may include a success indication and/or an edge host location. In other embodiments, the mobile application lifecycle management response may include a failure indication and/or failure codes.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a communication node, the method comprising:

identifying edge computing parameters for an edge computing system, wherein the edge computing parameters are used for routing user plane data to the edge computing system using a control plane of a mobile network;

determining that communications are to be performed at the edge computing system in accordance with the edge computing parameters; and sending the edge computing parameters to the mobile network control plane, wherein the determining that the communications are to be performed at the edge computing system comprises:
sending the edge computing parameters to a mobile edge orchestrator of the edge computing system; and
receiving a success indication from the mobile edge orchestrator.

2. The method of claim 1, wherein the determining that the communications are to be performed at the edge computing system comprises receiving from the mobile edge orchestrator at least one of: a mobile edge host location list, a mobile application identifier, and a user identifier.

3. The method of claim 1, wherein the identifying the edge computing parameters comprises: receiving the edge computing parameters from an operations support system of the edge computing system.

4. The method of claim 1, wherein:
the identifying the edge computing parameters comprises:
sending the edge computing parameters to an operations support system of the edge computing system; and
receiving a success indication from the operations support system.

5. The method of claim 4, wherein the identifying the edge computing parameters comprises receiving from the operations support system at least one of: a user identifier, a quality of service class identifier, and a mobile application identifier.

6. The method of claim 1, wherein the identifying the edge computing parameters comprises: receiving the edge computing parameters from a mobile edge orchestrator of the edge computing system.

7. The method of claim 1, further comprising: receiving a success indication from the control plane.

8. The method of claim 1, wherein the edge computing parameters comprise at least one of: a data network name, a slice identifier, a user plane function location identifier, a quality of service class identifier, a mobile application identifier, a traffic steering policy, a user identifier, and a session event subscription number.

9. The method of claim 1, wherein the control plane comprises at least one of: a policy control function, a network exposure function, and a session management function.

10. The method of claim 1, wherein the edge computing system is in accordance with a European Telecommunications Standards Institute Multi-access Edge Computing (ETSI-MEC) specification.

11. The method of claim 1, wherein the mobile network is either a 5G mobile network or a 4G mobile network.

12. A method performed by a communication node, the method comprising:
receiving edge computing parameters from a control plane of a mobile network, wherein the edge computing parameters are used for routing user plane data to an edge computing system;
sending the edge computing parameters to the edge computing system; and
receiving an indication that communications are to be performed at the edge computing system in accordance with the edge computing parameters,
wherein the edge computing parameters are initially identified by sending the edge computing parameters to an operations support system of the edge computing system, and thereafter receiving a success indication from the operations support system.

13. The method of claim 12, further comprising sending the indication to the control plane.

14. The method of claim 12, wherein the mobile network is either a 5G mobile network or a 4G mobile network.

15. The method of claim 12, wherein the edge computing parameters comprise at least one of: a data network name, a slice identifier, a user plane function location identifier, a quality of service class identifier, a mobile application identifier, a traffic steering policy, a user identifier, and a session event subscription number.

16. The method of claim 12, wherein the control plane comprises at least one of: a policy control function, a network exposure function, a service capability exposure function, and a session management function, mobility management entity, policy and charging rules function.

17. The method of claim 12, wherein the edge computing system is in accordance with a European Telecommunications Standards Institute Multi-access edge Computing (ETSI-MEC) specification.

* * * * *